United States Patent
Ogawa et al.

(10) Patent No.: US 12,259,372 B2
(45) Date of Patent: *Mar. 25, 2025

(54) METHOD OF CLEANING LIQUID CHROMATOGRAPHIC SYSTEM AND LIQUID CHROMATOGRAPHIC SYSTEM

(71) Applicant: SHIMADZU CORPORATION, Kyoto (JP)

(72) Inventors: Keisuke Ogawa, Columbia, MD (US); Andy Sasaki, Columbia, MD (US); Kerry Hill, Columbia, MD (US); Timothy Lee, Columbia, MD (US)

(73) Assignee: SHIMADZU CORPORATION, Kyoto (JP)

( * ) Notice: Subject to any disclaimer, the term of this patent is extended or adjusted under 35 U.S.C. 154(b) by 162 days.

This patent is subject to a terminal disclaimer.

(21) Appl. No.: 17/971,605

(22) Filed: Oct. 23, 2022

(65) Prior Publication Data

US 2023/0136050 A1 May 4, 2023

Related U.S. Application Data

(60) Provisional application No. 63/273,182, filed on Oct. 29, 2021.

(51) Int. Cl.
*G01N 30/32* (2006.01)
*B01D 15/14* (2006.01)
(Continued)

(52) U.S. Cl.
CPC ............. *G01N 30/46* (2013.01); *B01D 15/14* (2013.01); *B01D 15/163* (2013.01);
(Continued)

(58) Field of Classification Search
CPC ....... G01N 2030/027; G01N 2030/326; G01N 2030/328; G01N 30/20; G01N 30/32;
(Continued)

(56) References Cited

U.S. PATENT DOCUMENTS 10,416,133 B2 * 9/2019 Nakashima ........ G01N 30/8644
2006/0207941 A1 9/2006 Morikawa
(Continued)

FOREIGN PATENT DOCUMENTS

CN 1834642 A 9/2006
CN 103293253 A * 9/2013
(Continued)

OTHER PUBLICATIONS

Chinese Office Action dated Mar. 25, 2024 in corresponding Chinese Application No. 202211300102.6, with Machine Translation.
(Continued)

*Primary Examiner* — Andre J Allen
(74) *Attorney, Agent, or Firm* — Renner, Otto, Boisselle & Sklar, LLP

(57) ABSTRACT

A liquid chromatographic system includes a column, a needle, a valve, a pump, and an analysis flow path. The valve sets the analysis flow path by switching between a first flow path through which an eluent flows from the valve to the column via the needle and a second flow path through which the eluent flows from the valve to the column not via the needle. The first flow path can be cleaned by drive of a first cleaning pump while the first flow path is set, and the second flow path can be cleaned by drive of the first cleaning pump while the second flow path is set.

13 Claims, 26 Drawing Sheets

(51) Int. Cl.
  *B01D 15/16* (2006.01)
  *B01D 15/18* (2006.01)
  *B01D 15/42* (2006.01)
  *B08B 9/032* (2006.01)
  *G01N 30/20* (2006.01)
  *G01N 30/46* (2006.01)
  *G01N 30/02* (2006.01)

(52) U.S. Cl.
  CPC ....... *B01D 15/1864* (2013.01); *B01D 15/424* (2013.01); *B08B 9/0325* (2013.01); *G01N 30/20* (2013.01); *G01N 30/32* (2013.01); *B08B 2209/032* (2013.01); *G01N 2030/027* (2013.01); *G01N 2030/326* (2013.01); *G01N 2030/328* (2013.01)

(58) Field of Classification Search
  CPC ...... G01N 30/46; G01N 30/466; G01N 30/88; B01D 15/14; B01D 15/163; B01D 15/1864; B01D 15/424; B08B 2209/032; B08B 9/0325
  See application file for complete search history.

(56) References Cited

U.S. PATENT DOCUMENTS

| | | | |
|---|---|---|---|
| 2019/0086371 A1* | 3/2019 | Lauber | B01J 20/291 |
| 2021/0223218 A1 | 7/2021 | Maekawa | |
| 2021/0285919 A1 | 9/2021 | Watanabe et al. | |
| 2022/0011280 A1 | 1/2022 | Ogata et al. | |
| 2022/0107293 A1 | 4/2022 | Nogami et al. | |
| 2023/0037141 A1* | 2/2023 | Quint | G01N 30/466 |
| 2023/0128516 A1* | 4/2023 | Fujito | G01N 30/8641 73/61.56 |
| 2023/0132731 A1* | 5/2023 | Ogawa | G01N 30/46 73/61.56 |
| 2023/0136667 A1* | 5/2023 | Ogawa | B01D 15/163 73/61.55 |

FOREIGN PATENT DOCUMENTS

| | | |
|---|---|---|
| CN | 103907020 A | 7/2014 |
| CN | 212693690 U | 3/2021 |
| CN | 113167772 A | 7/2021 |
| CN | 113391011 A | 9/2021 |
| CN | 113396328 A | 9/2021 |
| EP | 3896443 A1 | 10/2021 |
| WO | 2017/216934 A1 | 12/2017 |

OTHER PUBLICATIONS

Office Action in copending U.S. Appl. No. 17/971,604 dated Oct. 24, 2024.
Chinese Office Action dated Jul. 22, 2024 in corresponding Chinese Application No. 202211300453.7, with Machine Translation.
Chinese Office Action dated Sep. 25, 2024 in corresponding Chinese Application No. 202211300334.1, with Machine Translation.
Chinese Office Action dated Dec. 20, 2024 in corresponding Chinese Application No. 202211300453.7, with Machine Translation.

* cited by examiner

FIG.20

|  | 1ST ANALYSIS FLOW PATH | | |
|---|---|---|---|
|  | SAMPLE SUCTION | SAMPLE INJECTION | ELUENT INJECTION |
| 1ST ANALYSIS FLOW PATH | 3RD OR 4TH CLEANING PATTERN | IMPOSSIBLE | 5TH CLEANING PATTERN |
| 2ND ANALYSIS FLOW PATH | 3RD OR 4TH CLEANING PATTERN | 3RD OR 4TH CLEANING PATTERN | ANY ONE OF 2ND, 4TH, AND 5TH CLEANING PATTERNS |
| 3RD ANALYSIS FLOW PATH | 3RD OR 4TH CLEANING PATTERN | 3RD OR 4TH CLEANING PATTERN | ANY ONE OF 2ND, 4TH, AND 5TH CLEANING PATTERNS |
| 4TH ANALYSIS FLOW PATH | 3RD OR 4TH CLEANING PATTERN | 3RD OR 4TH CLEANING PATTERN | ANY ONE OF 2ND, 4TH, AND 5TH CLEANING PATTERNS |

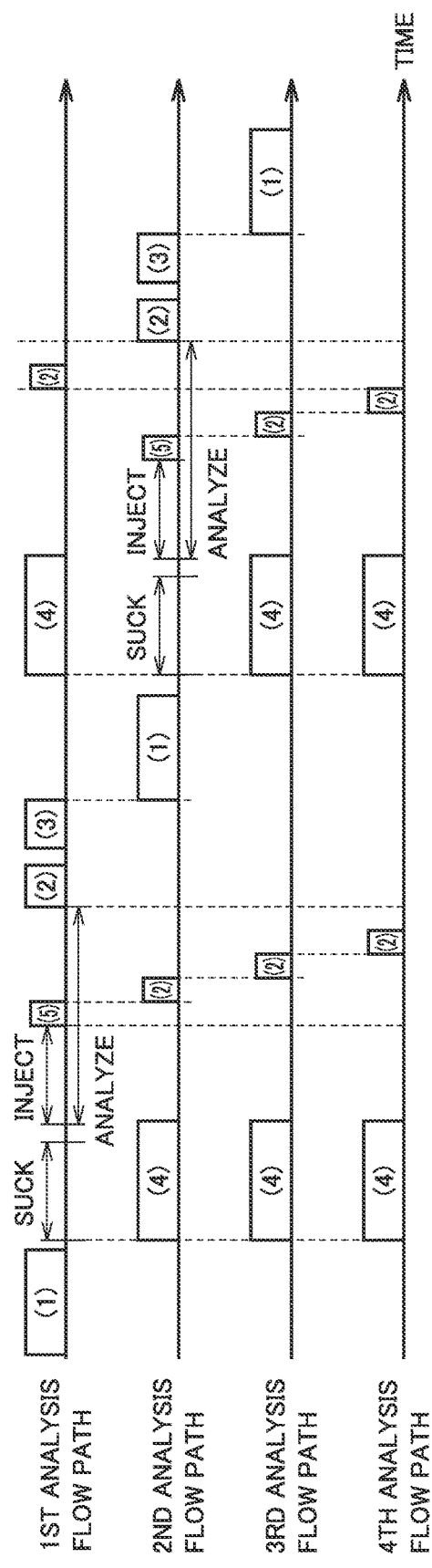

FIG.25

SETTING FOR AUTOMATIC CLEANING

☑ DO AUTOMATIC CLEANING

TARGET SETTING: — 401

| Use | Compound ID | Value | High Concentration Criteria | Blank Criteria |
|-----|-------------|-------|-----------------------------|----------------|
| ☑ | 1 | Area | Standard Level:10, Factor:10 ☐ | Standard Level:1, Factor:0.1 ☐ |
| ☐ | 3 | Height | 1000000 ☐ | 100 ☐ |

CLEANING METHOD:
AUTOSAMPLER: AutosamplerRinse.lcm — 402
STREAM: StreamRinse.lcm — 403

BLANK SAMPLE
Rack: 101    Vial#: 10 — 54

Blank Re-Run: 3

404:
● Specify Value      100000
○ Standard Level    10
   x Factor          10

400

METHOD OF CLEANING LIQUID CHROMATOGRAPHIC SYSTEM AND LIQUID CHROMATOGRAPHIC SYSTEM

BACKGROUND OF THE INVENTION

Field of the Invention

The present disclosure relates to a method of cleaning a liquid chromatographic system and a liquid chromatographic system.

Description of the Background Art

Liquid chromatography is a technology for separating a component contained in a sample by introducing a sample to be analyzed into a column together with an eluent which is a mobile phase. The component in the sample separated by liquid chromatography is analyzed by a detector such as a mass spectrometer.

WO2017/216934 describes a chromatographic mass spectrometry device including a plurality of streams for a liquid chromatogram. The chromatographic mass spectrometry device described in WO2017/216934 includes three flow paths to which a column is connected. In the chromatographic mass spectrometry device described in WO2017/216934, a mass spectrometer is connected to any one of the three flow paths through a selector valve connected thereto.

SUMMARY OF THE INVENTION

According to the chromatographic mass spectrometry device described in WO2017/216934, analysis efficiency can be enhanced by continuing analysis with switching among a plurality of flow paths being made. While the sample is analyzed with switching among the plurality of flow paths being made, however, some of the sample used in preceding analyses may be accumulated as contamination in a flow path and carryover may occur in at least one of the plurality of flow paths. As the number of flow paths that can be used for analysis increases, the number of flow paths where carryover may occur also increases. When carryover occurs, an appropriate analysis result may not be obtained. Therefore, appropriate cleaning of an analysis flow path used for analysis of the sample is demanded.

An object of the present disclosure is to provide a method of cleaning a liquid chromatographic system and a liquid chromatographic system that allow lessening of occurrence of carryover or elimination of carryover on the occurrence of carryover.

A method according to one aspect of the present disclosure is a method of cleaning a liquid chromatographic system. The liquid chromatographic system includes a first column and a second column for separation of a sample, a needle that takes a sample to be injected into the first column and the second column, an injection valve portion to which the first column and the second column are connected, the injection valve portion including a first injection valve connected to the first column and a second injection valve connected to the second column, a first pump that supplies an eluent to the first injection valve, a second pump that supplies an eluent to the second injection valve, a first analysis flow path constructed such that the eluent flows from the first injection valve toward the first column, a second analysis flow path constructed such that the eluent flows from the second injection valve toward the second column, and a selector valve connected to the first column and the second column, the selector valve switching an object to be connected to a detector between the first analysis flow path and the second analysis flow path. The method of cleaning a liquid chromatographic system includes setting a condition for feeding a cleaning solution or a blank sample to the selector valve, cleaning the first analysis flow path by feeding the cleaning solution or the blank sample while a first flow path through which the eluent flows from the first injection valve to the first column via the needle is set, and cleaning the first analysis flow path by feeding the cleaning solution or the blank sample while a second flow path through which the eluent flows from the first injection valve to the first column not via the needle is set.

A liquid chromatographic system according to one aspect of the present disclosure includes a first column and a second column for separation of a sample, a needle that takes a sample to be injected into the first column and the second column, an injection valve portion to which the first column and the second column are connected, the injection valve portion including a first injection valve connected to the first column and a second injection valve connected to the second column, a first pump that supplies an eluent to the first injection valve, a second pump that supplies an eluent to the second injection valve, a first analysis flow path constructed such that the eluent flows from the first injection valve toward the first column, a second analysis flow path constructed such that the eluent flows from the second injection valve toward the second column, a selector valve connected to the first column and the second column, the selector valve switching an object to be connected to a detector between the first analysis flow path and the second analysis flow path, and a controller. The controller can have the first analysis flow path cleaned by feed of a cleaning solution or a blank sample while a first flow path through which the eluent flows from the first injection valve to the first column via the needle is set, and have the first analysis flow path cleaned by feed of the cleaning solution or the blank sample while a second flow path through which the eluent flows from the first injection valve to the first column not via the needle is set.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 20 is a diagram showing a cleaning pattern that can be selected in first to fourth analysis flow paths.

FIG. 21 is a timing chart showing exemplary setting for the cleaning pattern.

FIG. 25 is a diagram showing an exemplary setting screen for automatic cleaning.

DESCRIPTION OF THE PREFERRED EMBODIMENTS

Figure 1:
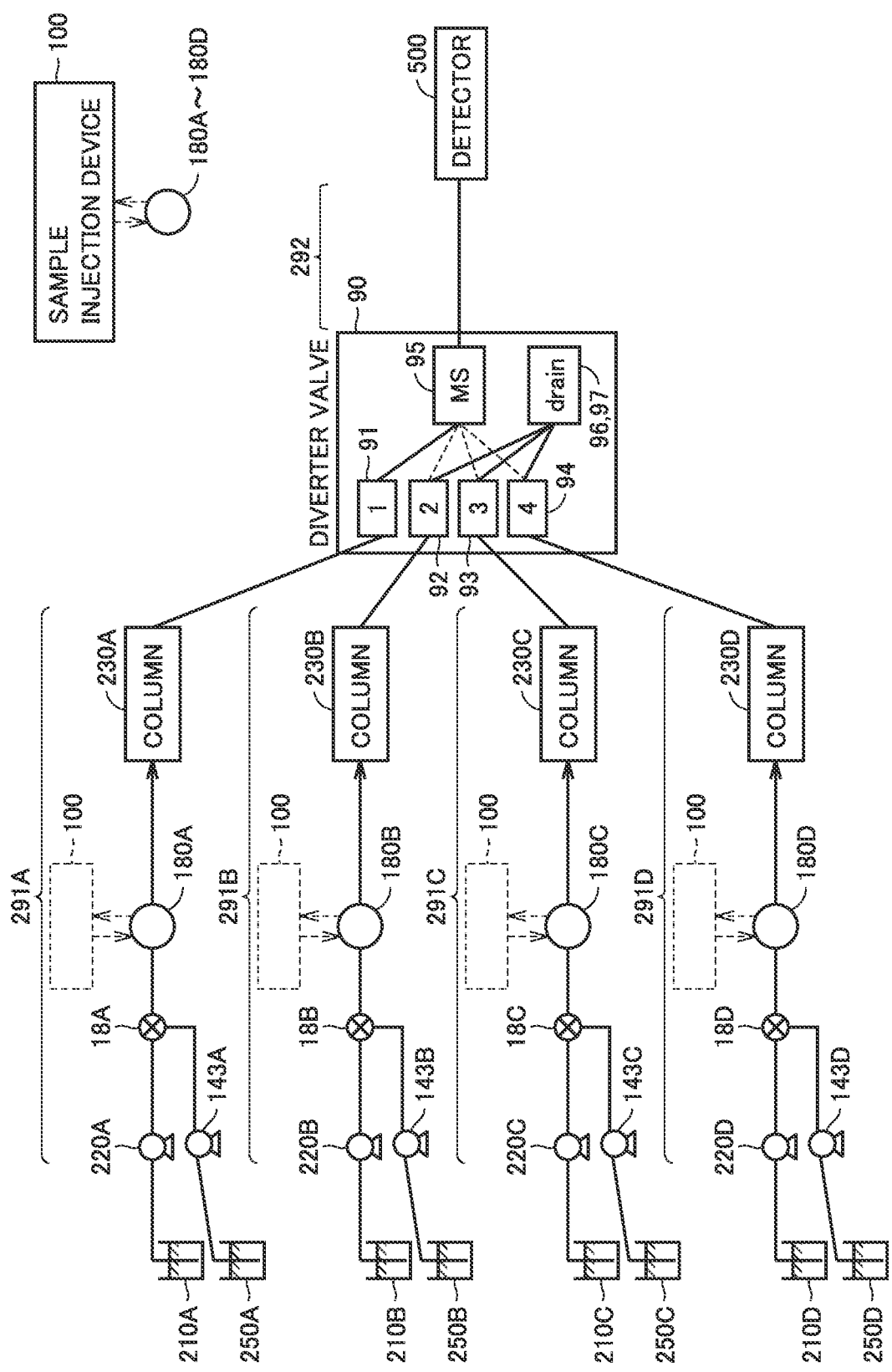
FIG. 1 is a diagram of a schematic construction of a liquid chromatographic system.

An embodiment of the present disclosure will be described in detail below with reference to the drawings. The same or corresponding elements in the drawings have the same reference characters allotted and description thereof will not be repeated.

<Overall Construction>

FIG. 1 is a diagram of a schematic construction of a liquid chromatographic system 10. In liquid chromatographic system 10, flow paths 291A to 291D used for analysis of a sample are provided. Flow paths 291A to 291D include high-pressure valves 180A to 180D, respectively. Flow paths 291A to 291D are connected to a flow path 292 which leads to a detector 500.

A diverter valve 90 is arranged between flow paths 291A to 291D and flow path 292.

Flow paths 291A to 291D are each switched between a first flow path which leads to diverter valve 90 via a sample injection device 100 and a second flow path which leads to diverter valve 90 not via sample injection device 100. Sample injection device 100 includes a needle for injection of a sample.

Diverter valve 90 includes ports 91 to 97. Flow path 291A is connected to port 91. Flow path 291B is connected to port 92. Flow path 291C is connected to port 93. Flow path 291D is connected to port 94. Detector 500 is connected to port 95. A liquid discharge pipe (not shown) is connected to ports 96 and 97. Port 95 corresponds to a main port. Ports 96 and 97 correspond to a drain port.

Diverter valve 90 implements a selector valve that switches an object to be connected to port 95 among ports 91 to 94. Through diverter valve 90, any one of flow paths 291A to 291D is connected to flow path 292 which leads to detector 500.

A construction of flow path 291A will be described in detail.

Flow path 291A is a flow path that includes high-pressure valve 180A and extends from high-pressure valve 180A in a direction toward a column 230A. Flow path 291A is switched by high-pressure valve 180A between the first flow path which leads to column 230A via sample injection device 100 and the second flow path which leads to column 230A not via sample injection device 100.

In flow path 291A, at least a high-pressure pump 220A, a cleaning pump 143A, a cleaning valve 18A, high-pressure valve 180A, and column 230A are arranged. High-pressure valve 180A is connected to column 230A. Column 230A is filled with a stationary phase for separating a component in a sample.

High-pressure valve 180A is connected to high-pressure pump 220A and cleaning pump 143A with cleaning valve 18A being interposed. High-pressure pump 220A supplies an eluent in a container 210A to high-pressure valve 180A. Cleaning pump 143A supplies a rinse solution in a container 250A to high-pressure valve 180A. Any one of high-pressure pump 220A and cleaning pump 143A is connected to high-pressure valve 180A through cleaning valve 18A. Consequently, the eluent or the rinse solution is supplied to high-pressure valve 180A.

When flow path 291A is set to the first flow path that passes through sample injection device 100, the eluent supplied from high-pressure pump 220A to high-pressure valve 180A flows to column 230A via sample injection device 100. The sample held in sample injection device 100 is sent to column 230A over the eluent.

When flow path 291A is set to the second flow path that does not pass through sample injection device 100, the eluent supplied from high-pressure pump 220A to high-pressure valve 180A flows to column 230A without passing through sample injection device 100. When the sample has already been injected into column 230A, the eluent is sent from high-pressure valve 180A to column 230A through the second flow path. Separation of the sample in column 230A thus proceeds.

Column 230A is connected to port 91 of diverter valve 90. When port 91 and port 95 are connected to each other in diverter valve 90, a component in the sample separated in column 230A flows to detector 500 via diverter valve 90. Consequently, the component in the sample separated in column 230A is analyzed by detector 500 implemented by a mass spectrometer or the like.

When cleaning pump 143A and high-pressure valve 180A are connected to each other through cleaning valve 18A, the rinse solution is supplied to high-pressure valve 180A. High-pressure valve 180A can allow a flow of the rinse solution to column 230A through or not through sample injection device 100. Thus, both of the first flow path leading to column 230A via sample injection device 100 and the second flow path leading to column 230A not via sample injection device 100 can be cleaned.

When port 91 and port 95 of diverter valve 90 are connected to each other, the rinse solution flows from column 230A to detector 500 via port 91 and port 95 of diverter valve 90. Consequently, flow path 292 leading from diverter valve 90 toward detector 500 is also cleaned. When port 91 and ports 96 and 97 of diverter valve 90 are connected to each other, port 91 and ports 96 and 97 of the diverter valve are cleaned.

The construction of flow path 291A is described above in detail. The construction of flow paths 291B to 291D will now be described.

Flow path 291B is a flow path that includes high-pressure valve 180B and extends from high-pressure valve 180B in a direction toward column 230B. Flow path 291B is switched by high-pressure valve 180B between the first flow path which leads to column 230B via sample injection device 100 and the second flow path which leads to column 230B not via sample injection device 100.

In flow path 291B, at least a high-pressure pump 220B that sucks an eluent from a container 210B, a cleaning pump 143B that sucks a rinse solution from a container 250B, a cleaning valve 18B, high-pressure valve 180B, and column 230B are arranged.

Flow path 291C is a flow path that includes high-pressure valve 180C and extends from high-pressure valve 180C in a direction toward column 230C. Flow path 291C is switched by high-pressure valve 180C between the first flow path which leads to column 230C via sample injection device 100 and the second flow path which leads to column 230C not via sample injection device 100.

In flow path 291C, at least a high-pressure pump 220C that sucks an eluent from a container 210C, a cleaning pump 143C that sucks a rinse solution from a container 250C, a cleaning valve 18C, high-pressure valve 180C, and column 230C are arranged.

Flow path 291D is a flow path that includes high-pressure valve 180D and extends from high-pressure valve 180D in a direction toward column 230D. Flow path 291D is switched by high-pressure valve 180D between the first flow path which leads to column 230D via sample injection device 100 and the second flow path which leads to column 230D not via sample injection device 100.

In flow path 291D, at least a high-pressure pump 220D that sucks an eluent from a container 210D, a cleaning pump 143D that sucks a rinse solution from a container 250D, a cleaning valve 18D, high-pressure valve 180D, and column 230D are arranged.

Thus, flow paths 291B to 291D are similar in construction to flow path 291A. Therefore, detailed description of flow path 291A that has already been provided is applied as detailed description of flow paths 291B to 291D.

Flow path 291A, flow path 291B, flow path 291C, and flow path 291D are also referred to below as a first analysis flow path 291A, a second analysis flow path 291B, a third analysis flow path 291C, and a fourth analysis flow path 291D, respectively. First analysis flow path 291A, second analysis flow path 291B, third analysis flow path 291C, and fourth analysis flow path 291D are each switched between the first flow path which leads to diverter valve 90 via sample injection device 100 and the second flow path which leads to diverter valve 90 not via sample injection device 100.

Liquid chromatographic system 10 can switch a flow path to be used for analysis among first analysis flow path 291A, second analysis flow path 291B, third analysis flow path 291C, and fourth analysis flow path 291D. Therefore, according to liquid chromatographic system 10, detector 500 can successively analyze various samples. Consequently, liquid chromatographic system 10 can achieve improved analysis efficiency.

Liquid chromatographic system 10 further includes cleaning pump 143A corresponding to first analysis flow path 291A, cleaning pump 143B corresponding to second analysis flow path 291B, cleaning pump 143C corresponding to third analysis flow path 291C, and cleaning pump 143D corresponding to fourth analysis flow path 291D. Such a construction allows cleaning of the flow paths in various patterns in liquid chromatographic system 10.

For example, when first analysis flow path 291A is being used for analysis of a sample, a desired flow path among second analysis flow path 291B, third analysis flow path 291C, and fourth analysis flow path 291D can be cleaned.

<Construction of Liquid Chromatographic System 10>

Figure 2:
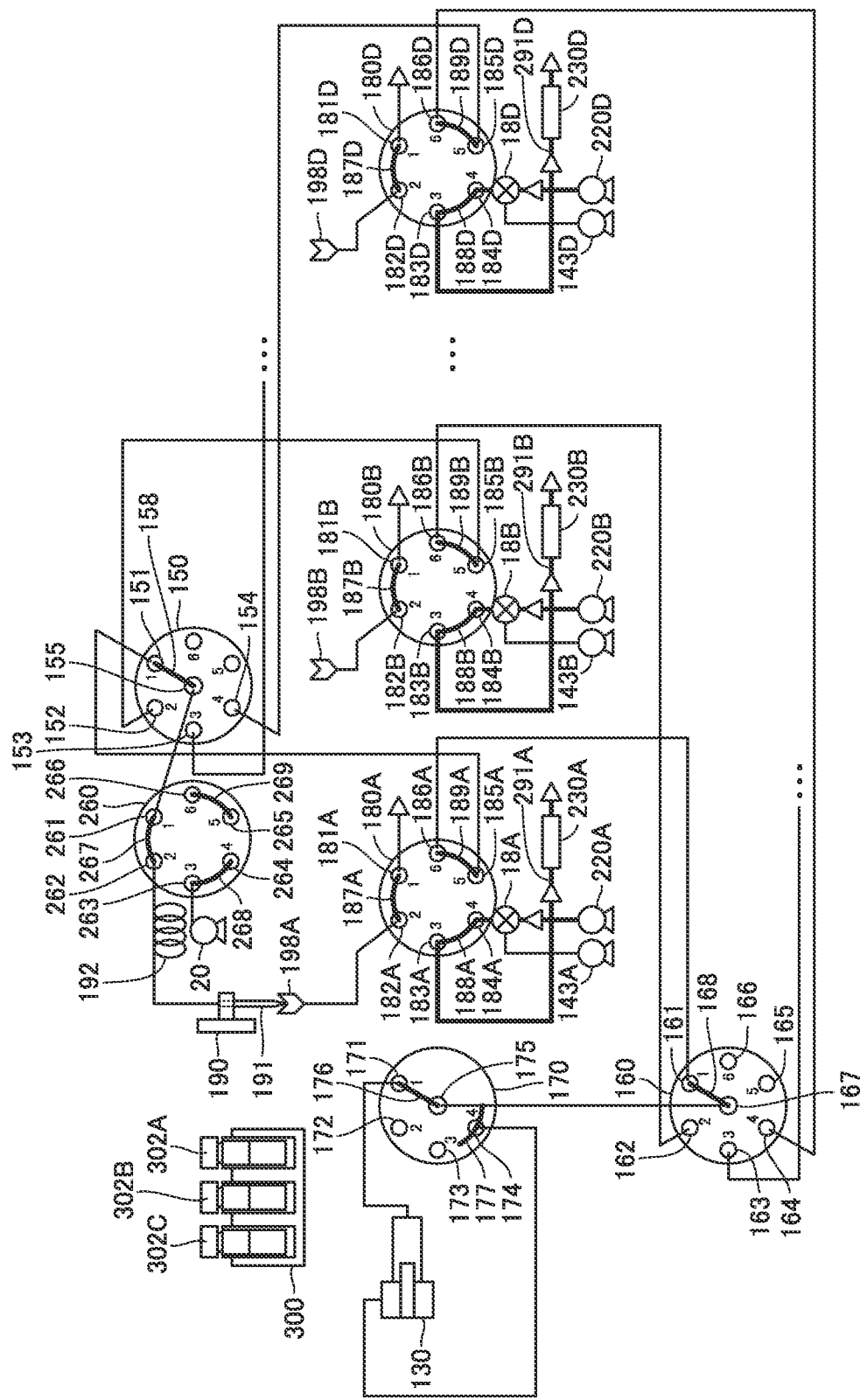
FIGS. 2 and 3 are diagrams each showing a construction of the liquid chromatographic system.
Figure 3:
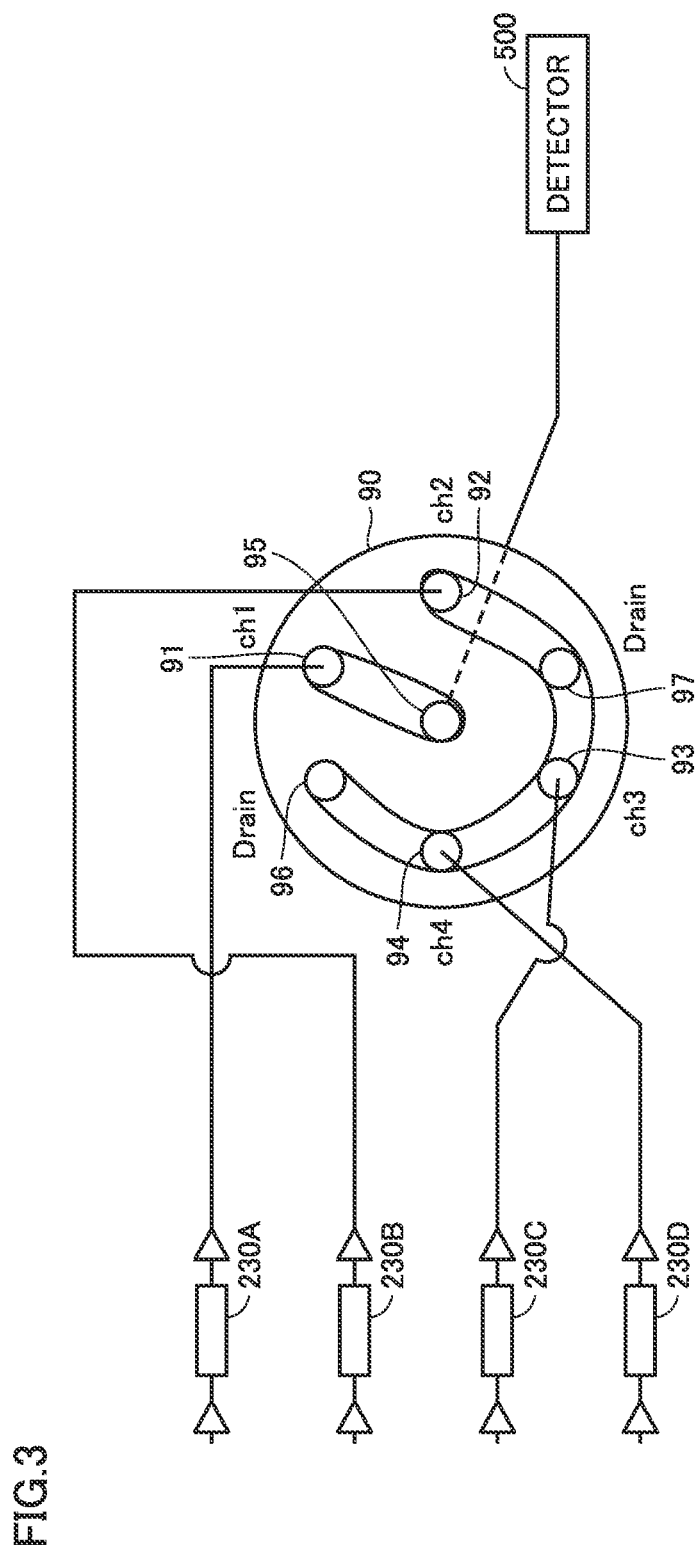

FIGS. 2 and 3 are diagrams each showing a construction of liquid chromatographic system 10. In particular, FIG. 3 shows a construction of diverter valve 90 included in liquid chromatographic system 10.

As described with reference to FIG. 1, liquid chromatographic system 10 includes four high-pressure valves 180A to 180D. FIG. 2 does not show features relating to high-pressure valve 180C among four high-pressure valves 180A to 180D shown in FIG. 1.

High-pressure valves 180A to 180D are connected to a first selector valve 150 and a second selector valve 160. First selector valve 150 and second selector valve 160 perform a function to select a high-pressure valve involved with suction and injection of a sample among high-pressure valves 180A to 180D. First selector valve 150 and second selector valve 160 are each implemented, for example, by a multi-way selector valve.

First selector valve 150 is connected to a needle valve 260. Needle valve 260 is connected to a needle 191 with a sample loop 192 being interposed. Needle 191 is a component like a syringe needle for sucking a sample. Sample loop 192 holds a sample sucked by needle 191. A needle moving mechanism 190 moves needle 191 in each of directions along three axes orthogonal to one another.

Liquid chromatographic system 10 includes injection ports 198A to 198D. Injection port 198A is provided in correspondence with high-pressure valve 180A. Injection port 198B is provided in correspondence with high-pressure valve 180B. Injection port 198C is provided in correspondence with high-pressure valve 180C. Injection port 198D is provided in correspondence with high-pressure valve 180D.

Containers 302A to 302C where samples are accommodated are placed on a sample carrier 300. Needle moving mechanism 190 moves needle 191 for suction of the sample from one of containers 302A to 302C. Needle moving mechanism 190 moves needle 191 for injection of the sucked sample into one of injection ports 198A to 198D.

A needle cleaning pump 20 is further connected to needle valve 260.

Second selector valve 160 is connected to a low-pressure valve 170. Low-pressure valve 170 is connected to a metering pump 130. Metering pump 130 is used for suction of a prescribed amount of sample by needle 191.

High-pressure valve 180A includes ports 181A to 186A. Port 181A is connected to a not-shown liquid discharge pipe. In other words, port 181A is a drain port. Port 182A is connected to injection port 198A. Port 183A is connected to column 230A. Port 184A is connected to high-pressure pump 220A and cleaning pump 143A with cleaning valve 18A being interposed. Port 185A is connected to first selector valve 150. Port 186A is connected to second selector valve 160.

High-pressure valve 180A includes connection portions 187A to 189A. Connection portions 187A to 189A switch a state of connection of ports 181A to 186A between a first state and a second state.

The first state is a state shown in FIG. 2. Specifically, the first state is a state in which port 181A and port 182A are connected to each other, port 183A and port 184A are connected to each other, and port 185A and port 186A are connected to each other.

In the first state, first selector valve 150 and second selector valve 160 are connected to each other with high-pressure valve 180A being interposed. In the first state, column 230A and high-pressure pump 220A or cleaning pump 143A are connected to each other with high-pressure valve 180A being interposed. In the first state, injection port 198A is connected to port 181A which is the drain port of high-pressure valve 180A.

The second state is a state resulting from turning of connection portions 187A to 189A shown in FIG. 1 by thirty degrees around the center of high-pressure valve 180A. Specifically, the second state is a state in which port 182A and port 183A are connected to each other, port 184A and port 185A are connected to each other, and port 186A and port 181A are connected to each other. The second state is shown, for example, in FIG. 6.

High-pressure valves 180B to 180D are similar in construction to high-pressure valve 180A. High-pressure valves 180B to 180D are each switched between the first state and the second state similarly to high-pressure valve 180A. Further description of high-pressure valves 180B to 180D is substantially repetition of the description of the construction of high-pressure valve 180A. Therefore, further description of high-pressure valves 180A to 180D will not be repeated.

First selector valve 150 includes ports 151 to 155. High-pressure valve 180A is connected to port 151. High-pressure valve 180B is connected to port 152. High-pressure valve 180C is connected to port 153. High-pressure valve 180D is connected to port 154. Needle valve 260 is connected to port 155.

First selector valve 150 includes a connection portion 158. Connection portion 158 switches an object to be connected to port 155 among ports 151 to 154.

Needle valve 260 includes ports 261 to 266 and connection portions 267 to 269. First selector valve 150 is connected to port 261. Sample loop 192 is connected to port 262. Needle cleaning pump 20 is connected to port 263.

Needle valve 260 switches a state of connection portions 267 to 269 between the state shown in FIG. 2 and a state resulting from turning of connection portions 267 to 269 by thirty degrees around the center of needle valve 260 from the state shown in FIG. 2.

In the state shown in FIG. 2, needle 191 is connected to needle valve 260 with sample loop 192 being interposed, needle valve 260 is connected to first selector valve 150, and first selector valve 150 is connected to high-pressure valve 180A. Furthermore, high-pressure valve 180A is connected to second selector valve 160, and second selector valve 160 is connected to metering pump 130 with low-pressure valve 170 being interposed. Therefore, as needle 191 is moved to any one of containers 302A to 302C and then metering pump 130 is driven, needle 191 sucks the sample.

As shown in FIG. 3, columns 230A to 230D are connected to diverter valve 90. FIG. 3 shows a state that port 95 formed at the center of diverter valve 90 and port 91 corresponding to column 230A are connected to each other. At this time, ports 92 to 94 of diverter valve 90 are connected to ports 96 and 97 which are drain ports of diverter valve 90.

In this state, the flow path including column 230A is connected to detector 500. Detector 500 can analyze the sample in column 230A. The flow path including column 230B leads to a not-shown liquid discharge pipe through ports 96 and 97 of diverter valve 90. The flow path including column 230C and the flow path including column 230D also similarly lead to the not-shown liquid discharge pipe through ports 96 and 97 of diverter valve 90.

As described above, liquid chromatographic system 10 includes a large number of valves. In relation with first selector valve 150 and second selector valve 160, diverter valve 90 can also be referred to as a third selector valve and needle valve 260 can also be referred to as a fourth selector valve.

<Block Diagram of Liquid Chromatographic System 10>

Figure 4:
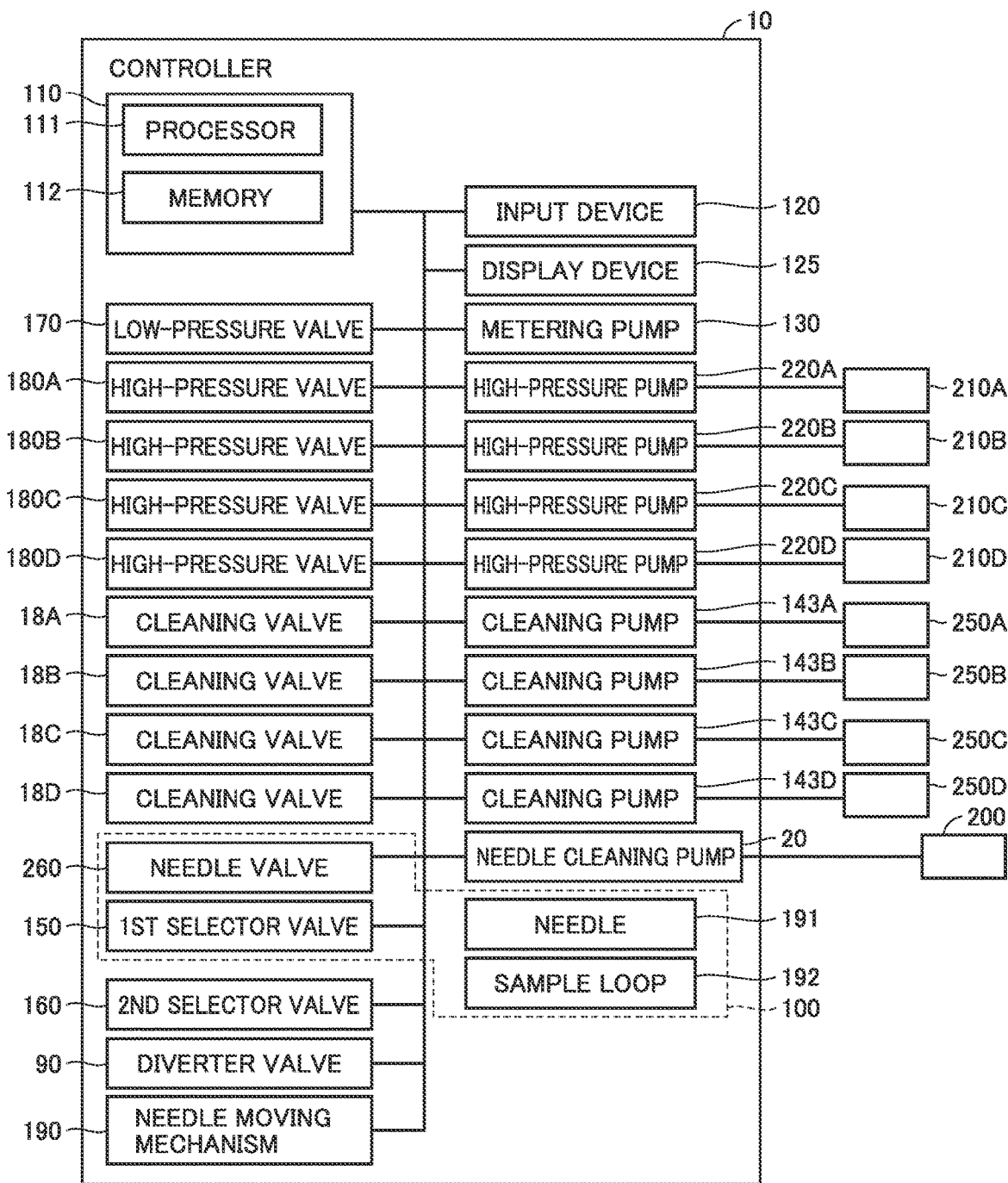
FIG. 4 is a block diagram showing the construction of the liquid chromatographic system.

FIG. 4 is a block diagram showing the construction of liquid chromatographic system 10. As described so far, liquid chromatographic system 10 includes a large number of valves and a large number of pumps.

The valves provided in liquid chromatographic system 10 include low-pressure valve 170, high-pressure valves 180A to 180D, cleaning valves 18A to 18D, needle valve 260, first selector valve 150, second selector valve 160, and diverter valve 90.

Since the specific construction of these valves has already been described with reference to FIGS. 1 to 3, description thereof will not be repeated.

The pumps provided in liquid chromatographic system 10 include high-pressure pumps 220A to 220D, cleaning pumps 143A to 143D, needle cleaning pump 20, and metering pump 130. High-pressure pumps 220A to 220D suck the eluent from containers 210A to 210D, respectively. Cleaning pumps 143A to 143D suck the rinse solution from containers 250A to 250D, respectively.

An identical eluent may be accommodated in containers 210A to 210D, or different types of eluents may be accommodated in containers 210A to 210D, respectively. An identical rinse solution may be accommodated in containers 250A to 250D, or different types of rinse solutions may be accommodated in containers 250A to 250D, respectively.

Needle cleaning pump 20 sucks the rinse solution from a container 200. A rinse solution identical to the rinse solution accommodated in containers 250A to 250D may be accommodated in container 200, or a rinse solution different in type from the rinse solution accommodated in containers 250A to 250D may be accommodated in container 200.

Sample injection device 100 includes first selector valve 150, needle valve 260, needle 191, and sample loop 192.

Liquid chromatographic system 10 further includes a controller 110, an input device 120, a display device 125, and needle moving mechanism 190. Since details of needle moving mechanism 190 have already been described with reference to FIG. 2, description thereof will not be repeated.

Controller 110 includes a processor 111 and a memory 112. Processor 111 is typically a computing processing unit such as a central processing unit (CPU) or a multi-processing unit (MPU). Processor 111 performs processing of liquid chromatographic system 10 by reading and executing a program stored in memory 112.

Memory 112 is implemented by a non-volatile memory such as a random access memory (RAM), a read only memory (ROM), and a flash memory. So long as a program can be recorded in a non-transitory manner in a format readable by processor 111, memory 112 may be implemented by a compact disc-read only memory (CD-ROM), a digital versatile disk-read only memory (DVD-ROM), a universal serial bus (USB) memory, a memory card, a flexible disk (FD), a hard disk, a solid state drive (SSD), a magnetic tape, a cassette tape, a magnetic optical disc (MO), a mini disc (MD), an integrated circuit (IC) card (except for a memory card), an optical card, a mask ROM, or an EPROM.

Input device 120 is implemented, for example, by a keyboard and a mouse. A user can input various instructions to controller 110 by operating input device 120. An image in accordance with a video signal outputted from controller 110 is shown on display device 125.

Setting information for each of first analysis flow path 291A to fourth analysis flow path 291D (see FIG. 1) provided in liquid chromatographic system 10 is shown on display device 125. The user can set a schedule for analysis with the use of first analysis flow path 291A to fourth analysis flow path 291D while the user looks at a screen on display device 125. Controller 110 conducts analysis based on the inputted schedule and has first analysis flow path 291A to fourth analysis flow path 291D cleaned.

<Suction of Sample>

Figure 5:
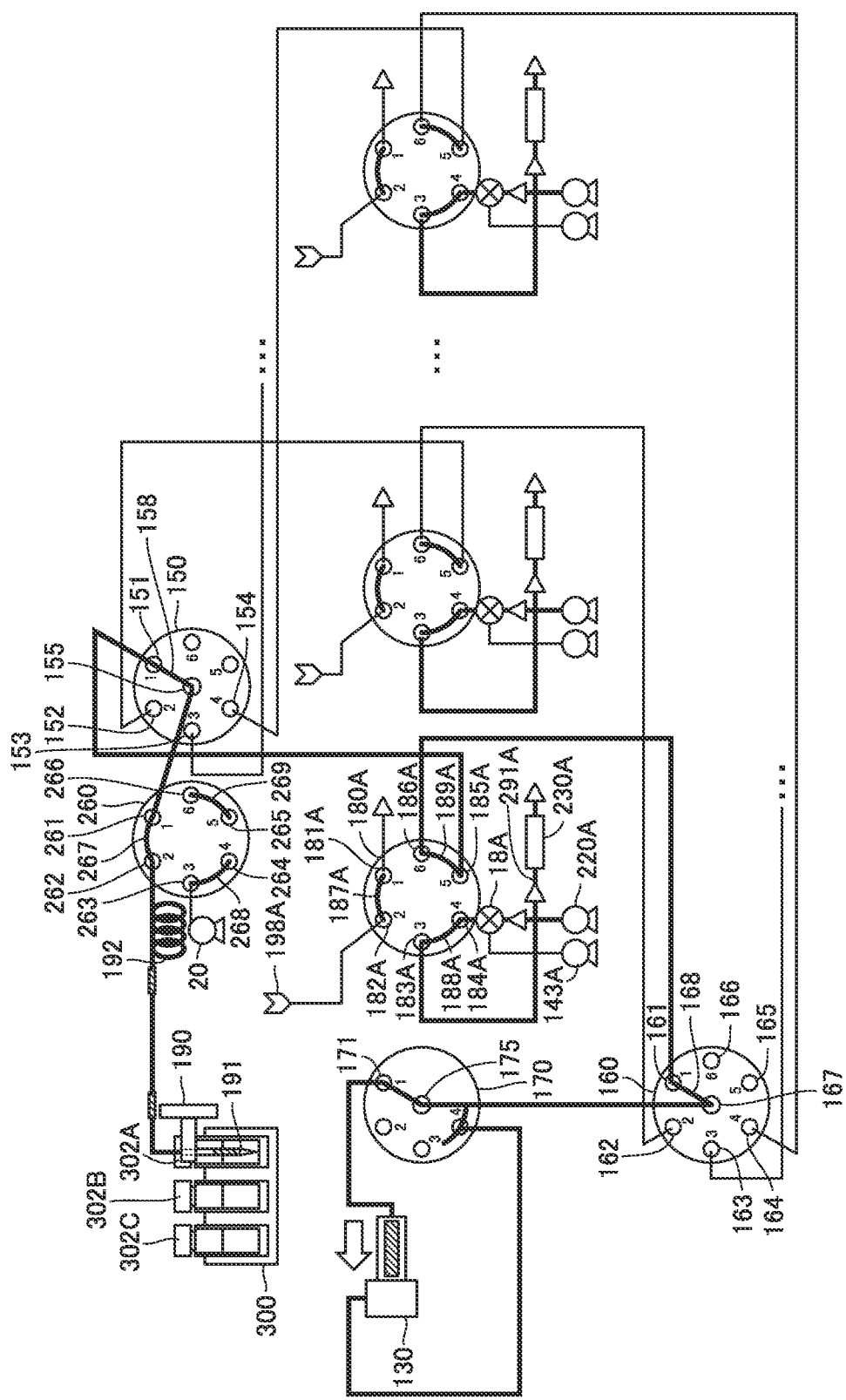
FIG. 5 is a diagram exemplifying a state of suction of a sample by a needle.

FIG. 5 is a diagram exemplifying a state of suction of a sample by needle 191. An example of suction of a sample to be injected into injection port 198A by needle 191 from container 302A will be described.

Injection port 198A corresponds to high-pressure valve 180A among high-pressure valves 180A to 180D. Therefore, first selector valve 150 and second selector valve 160 are connected to high-pressure valve 180A. As illustrated, first selector valve 150 is connected to needle 191 with needle valve 260 and sample loop 192 being interposed. Needle moving mechanism 190 guides needle 191 to container 302A. Second selector valve 160 is connected to metering pump 130 with low-pressure valve 170 being interposed.

Metering pump 130 applies a prescribed negative pressure to needle 191 with low-pressure valve 170, second selector valve 160, first selector valve 150, and needle valve 260 being interposed. Needle 191 thus sucks a prescribed amount of sample from container 302A. The sample sucked by needle 191 is held, for example, around sample loop 192.

FIG. 5 shows an example in which the sample is sucked via high-pressure valve 180A. As an object to which first selector valve 150 and second selector valve 160 are connected is switched among high-pressure valves 180B to 180D, the sample is sucked via corresponding one of high-pressure valves 180B to 180D.

First selector valve 150 and second selector valve 160 implement a switching device that switches a high-pressure valve through which the flow path leading from metering pump 130 to needle 191 passes, among high-pressure valves 180A to 180D.

<Injection of Sample>

Figure 6:
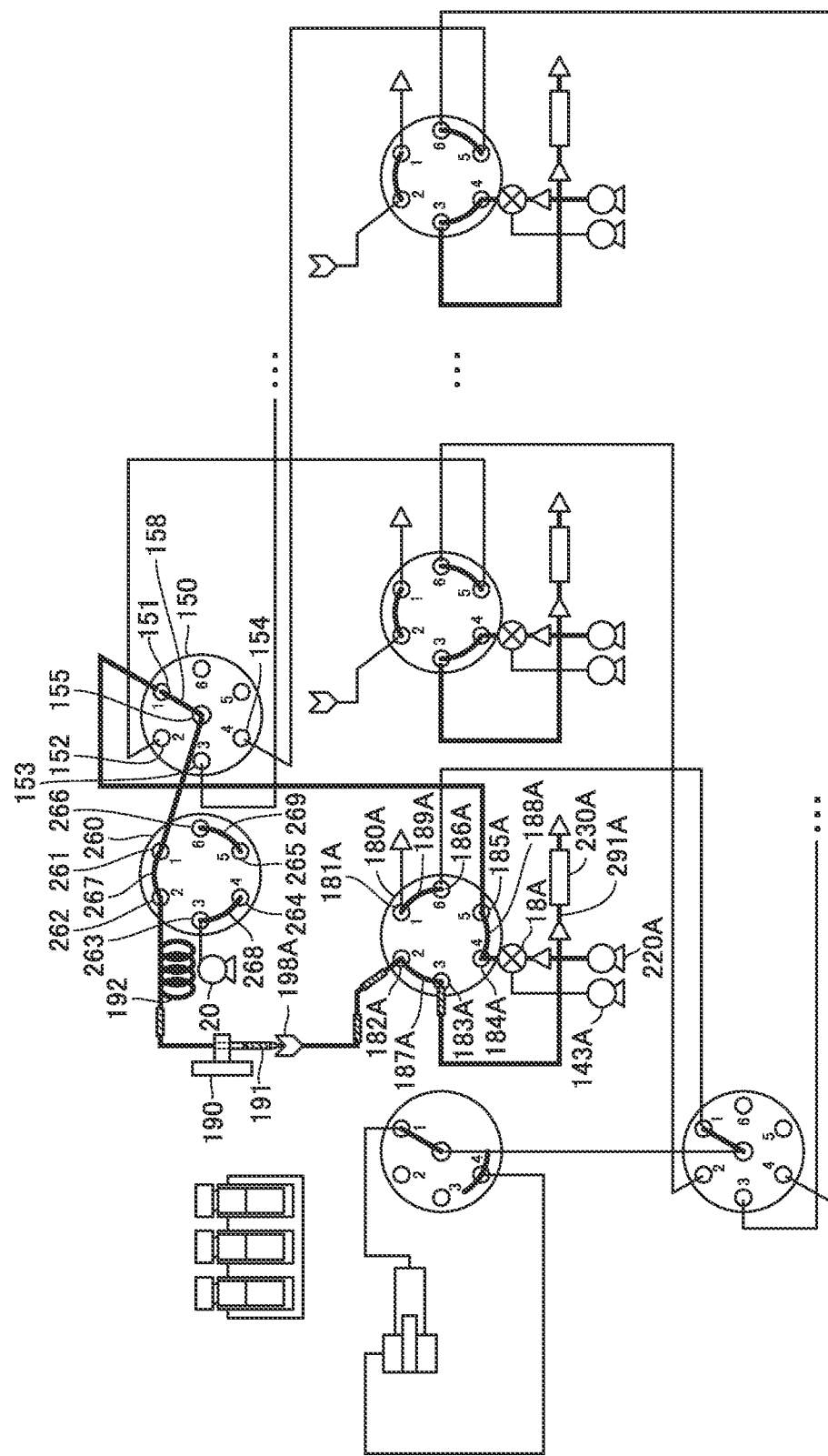
FIG. 6 is a diagram exemplifying a state of injection of the sample sucked by the needle into an injection port.

FIG. 6 is a diagram exemplifying a state of injection of the sample sucked by needle 191 into injection port 198A.

In injection of the sample into injection port 198A, connection portions 187A to 189A are turned by thirty degrees around the center of high-pressure valve 180A from the state shown in FIG. 5. High-pressure valve 180A and high-pressure pump 220A are connected to each other through cleaning valve 18A. Needle moving mechanism 190 moves needle 191 to injection port 198A.

Consequently, the flow path from high-pressure pump 220A via high-pressure valve 180A, first selector valve 150, needle 191, injection port 198A, and high-pressure valve 180A to column 230A is formed. This flow path corresponds to the first flow path that passes through sample injection device 100 in first analysis flow path 291A as described with reference to FIG. 1. At this time, column 230A is connected to detector 500 with diverter valve 90 being interposed. FIG. 6 does not show a state of connection between column 230A and diverter valve 90. The state of connection is as shown, for example, in FIG. 3.

As high-pressure pump 220A is driven while the flow path is formed as above, the eluent is supplied to high-pressure valve 180A. The eluent supplied to high-pressure valve 180A flows in a direction toward needle 191 via first selector valve 150 and the like. The sample held around sample loop 192 is thus injected together with the eluent from a tip end of needle 191 into injection port 198A. The injected sample flows to column 230A together with the eluent.

FIG. 6 shows an example in which the sample is injected into injection port 198A corresponding to high-pressure valve 180A. As an object to which first selector valve 150 is connected is switched among high-pressure valves 180B to 180D, the sample is injected into corresponding one of injection ports 198B to 198D corresponding to respective high-pressure valves 180B to 180D.

<Injection of Eluent>

Figure 7:
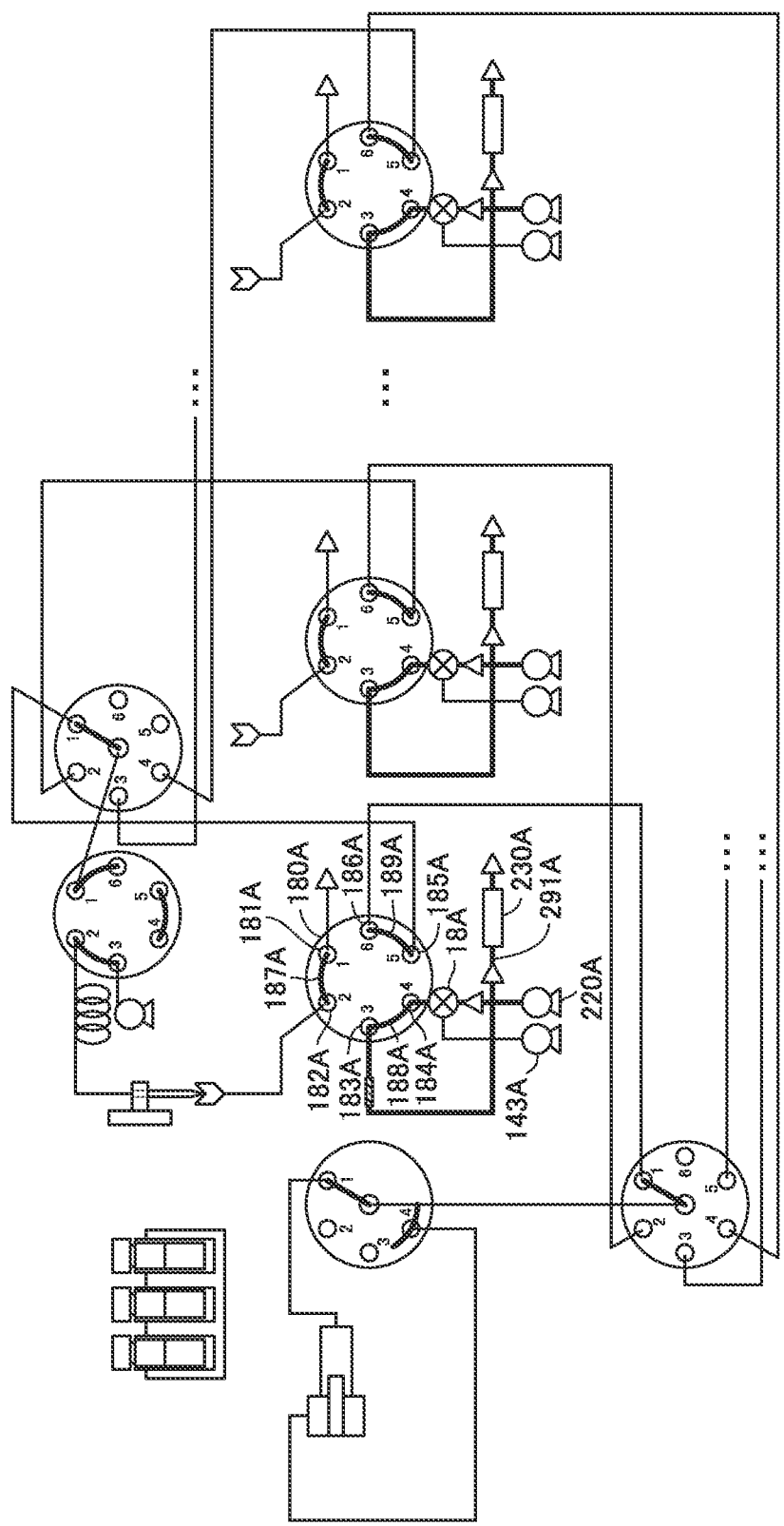
FIG. 7 is a diagram exemplifying a state of injection of an eluent into a column after the sample is guided to the column.

FIG. 7 is a diagram exemplifying a state of injection of an eluent into column 230A after the sample is guided to column 230A.

After the sample is guided to column 230A, connection portions 187A to 189A are turned by thirty degrees around the center of high-pressure valve 180A from the state shown in FIG. 6. High-pressure pump 220A is thus connected to column 230A through port 184A and port 183A of high-pressure valve 180A.

This flow path corresponds to the second flow path that does not pass through sample injection device 100 in first analysis flow path 291A as described with reference to FIG. 1. At this time, column 230A is connected to detector 500 with diverter valve 90 being interposed. The state of connection is as shown, for example, in FIG. 3. As the eluent is supplied from high-pressure pump 220A to high-pressure valve 180A, the sample is separated in column 230A.

At this time, injection port 198A is connected to port 181A which is the drain port of high-pressure valve 180A. Furthermore, connection portions 267 to 269 of needle valve 260 are turned by thirty degrees around the center of needle valve 260 from the state shown in FIG. 6. Consequently, needle cleaning pump 20 is connected to needle 191 with needle valve 260 and sample loop 192 being interposed.

FIG. 7 shows an example in which the eluent is injected into column 230A. As high-pressure pumps 220B to 220D corresponding to respective high-pressure valves 180B to 180D are driven, the eluent is similarly injected into respective columns 230B to 230D.

<Switching of Analysis Flow Path>

Figure 8:
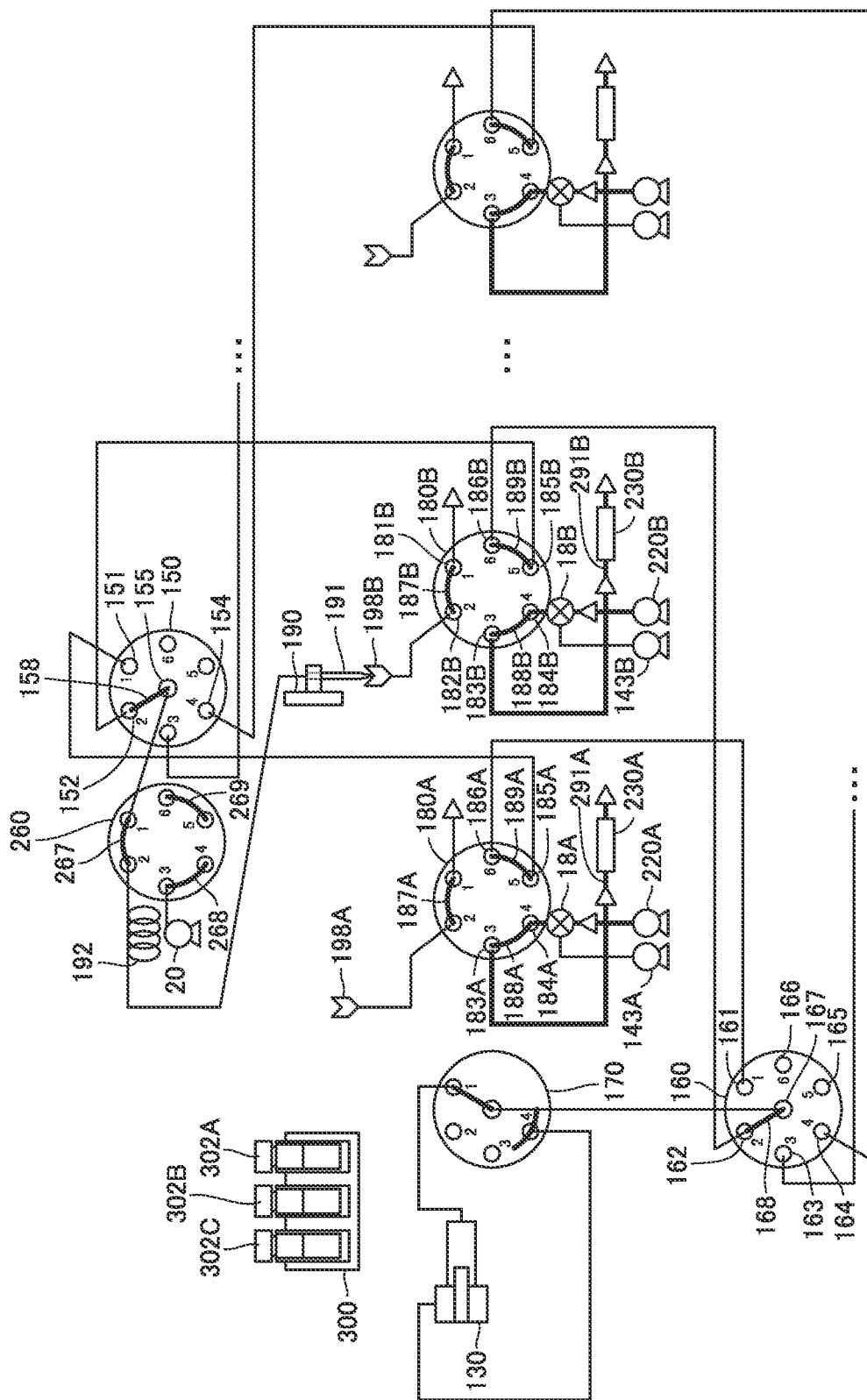
FIG. 8 is a diagram exemplifying a state of switching of a stream to be used for analysis from a first stream to a second stream.

FIG. 8 is a diagram exemplifying a state of switching of a flow path to be used for analysis of a sample from first analysis flow path 291A to second analysis flow path 291B. The concept of first analysis flow path 291A and second analysis flow path 291B is as described with reference to FIG. 1.

When the flow path to be used for analysis of the sample is switched from first analysis flow path 291A to second analysis flow path 291B, the state of first selector valve 150 and second selector valve 160 changes. Specifically, connection portion 158 of first selector valve 150 switches an object to which port 155 is connected from port 151 to port 152. Connection portion 168 of second selector valve 160 switches an object to which port 167 is connected from port 161 to port 162.

First selector valve 150 and second selector valve 160 are thus connected to high-pressure valve 180B. As illustrated, first selector valve 150 is connected to needle 191 with needle valve 260 and sample loop 192 being interposed. Second selector valve 160 is connected to metering pump 130 with low-pressure valve 170 being interposed.

For example, after needle 191 is moved to any one of containers 302A to 302C where the samples are accommodated, controller 110 has metering pump 130 driven. The sample can thus be sucked by needle 191 via high-pressure valve 180B. Injection port 198B corresponds to high-pressure valve 180B among high-pressure valves 180A to 180D. Therefore, by injection of the sample sucked by needle 191 into injection port 198B, the sample can be guided to column 230B corresponding to second analysis flow path 291B.

<Construction in Comparative Example>

Figure 9:
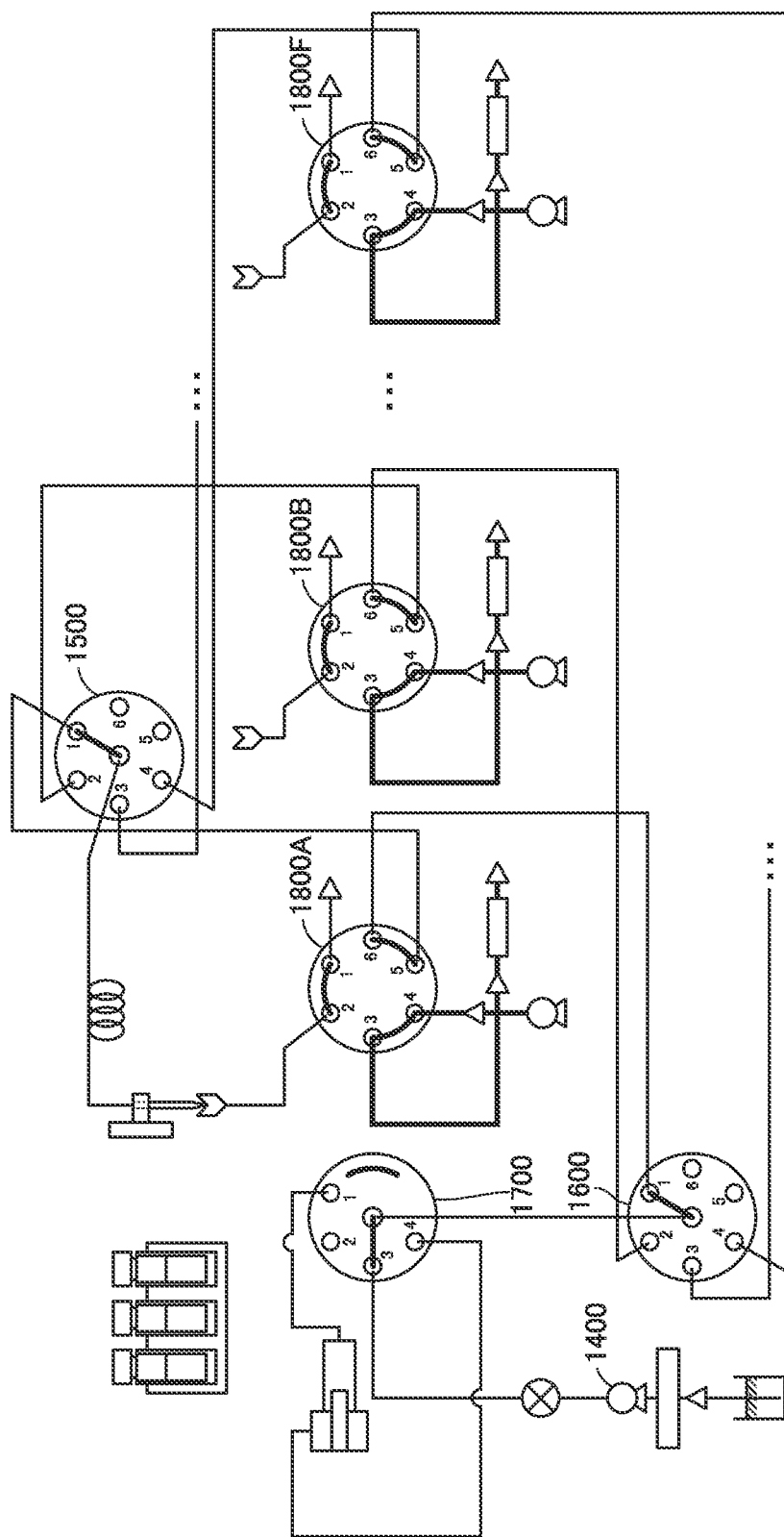
FIG. 9 is a diagram showing a comparative example of the liquid chromatographic system according to the present embodiment.

FIG. 9 is a diagram showing a comparative example of liquid chromatographic system 10 according to the present embodiment. The comparative example includes a plurality of high-pressure valves 1800A to 1800F, a first selector valve 1500, a second selector valve 1600, and a low-pressure valve 1700.

First selector valve 1500 and second selector valve 1600 are in coordination, and connected to any one of high-pressure valves 1800A to 1800F. Low-pressure valve 1700 is connected to any one of high-pressure valves 1800A to 1800F with second selector valve 1600 being interposed.

In the comparative example, a cleaning pump corresponding to each of high-pressure valves 1800A to 1800F is not provided, but a cleaning pump 1400 corresponding to low-pressure valve 1700 is provided. As cleaning pump 1400 is driven, the rinse solution is supplied to second selector valve 1600 via low-pressure valve 1700. In the comparative example, as cleaning pump 1400 is driven while first selector valve 1500 and second selector valve 1600 are connected to high-pressure valve 1800A, a flow path including high-pressure valve 1800A can be cleaned.

A flow path including high-pressure valve 1800B, however, cannot be cleaned while first selector valve 1500 and second selector valve 1600 are connected to high-pressure valve 1800A. Similarly, flow paths including respective high-pressure valves 1800C to 1800F cannot be cleaned while first selector valve 1500 and second selector valve 1600 are connected to high-pressure valve 1800A.

While first selector valve 1500 and second selector valve 1600 are connected to high-pressure valve 1800A, a sample may be being analyzed through the flow path including high-pressure valve 1800A. At this time, the flow paths including respective high-pressure valves 1800B to 1800F are not being used for analysis of the sample. In the comparative example, however, an object to which the rinse solution from cleaning pump 1400 is supplied is limited to an object to which second selector valve 1600 is connected. Therefore, in the comparative example, while second selector valve 1600 is connected to high-pressure valve 1800A, flow paths including respective high-pressure valves 1800B to 1800F cannot be cleaned.

In contrast, liquid chromatographic system 10 according to the present embodiment includes cleaning pumps 143A to 143D corresponding to respective high-pressure valves 180A to 180D. Therefore, according to liquid chromatographic system 10, the flow paths including respective high-pressure valves 180A to 180D can be cleaned with the rinse solution without liquid chromatographic system 10 being affected by to which of high-pressure valves 180A to 180D second selector valve 160 is connected.

<Overview of First Cleaning Pattern to Fifth Cleaning Pattern>

Figure 10:
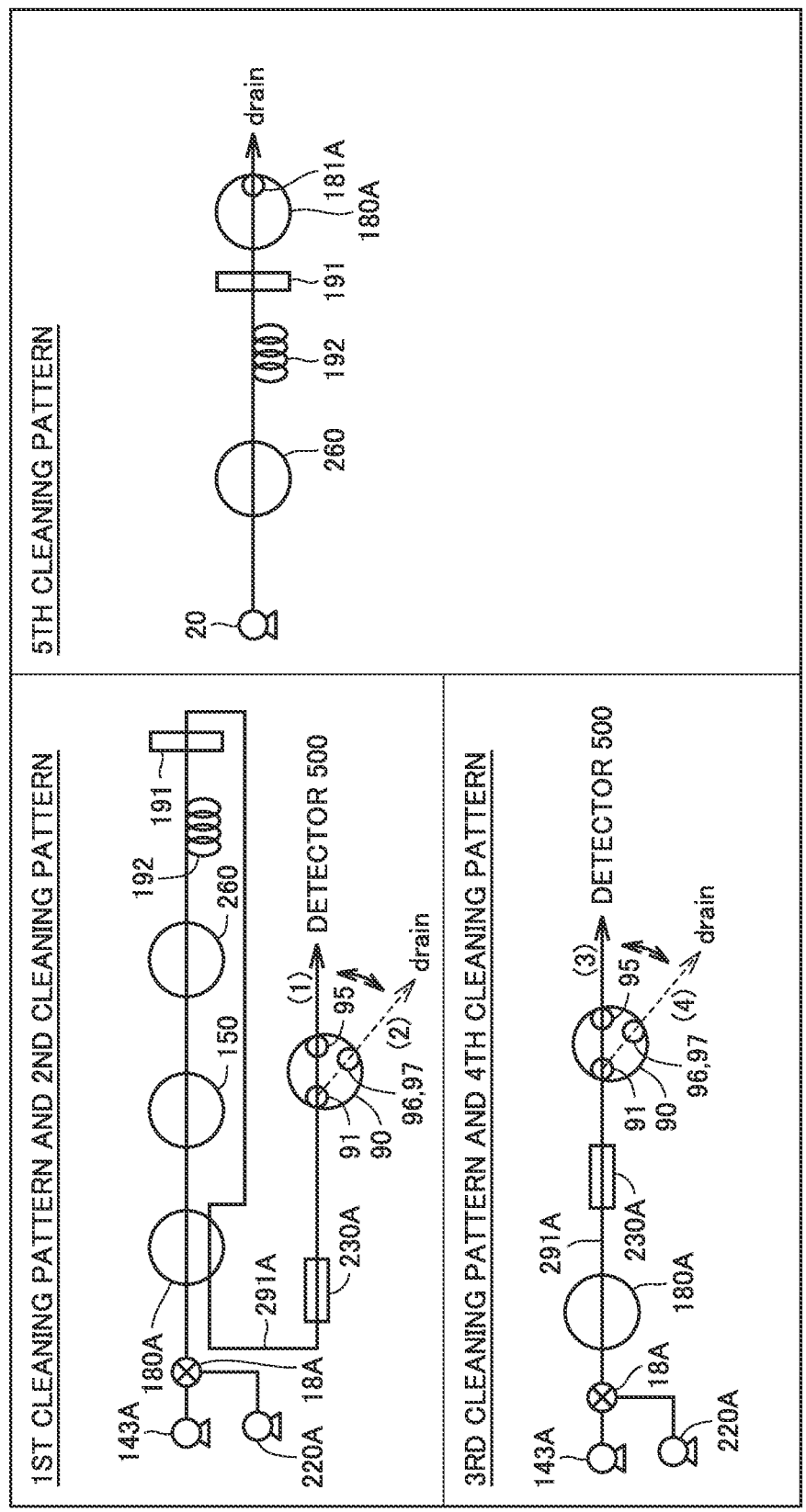
FIG. 10 is a diagram for illustrating overview of a first cleaning pattern to a fifth cleaning pattern.

FIG. 10 is a diagram for illustrating overview of a first cleaning pattern to a fifth cleaning pattern. A cleaning pattern is described with reference to FIG. 10, with a flow path including high-pressure valve 180A being focused on. Liquid chromatographic system 10 can clean the flow path including high-pressure valve 180A in the first cleaning pattern to the fifth cleaning pattern shown in FIG. 10.

In the first cleaning pattern and the second cleaning pattern, the flow path including high-pressure valve 180A is set as in an upper left frame. A solid arrow in diverter valve 90 represents a flow path set as the first cleaning pattern and a dashed arrow in diverter valve 90 represents a flow path set as the second cleaning pattern.

In the first cleaning pattern and the second cleaning pattern, the rinse solution supplied from cleaning pump 143A to high-pressure valve 180A flows sequentially through high-pressure valve 180A, first selector valve 150, needle valve 260, sample loop 192, needle 191, high-pressure valve 180A, column 230A, and diverter valve 90.

The flow path for cleaning set as the first cleaning pattern and the second cleaning pattern corresponds to the first flow path that passes through needle valve 260, sample loop 192, and needle 191. The first flow path represents, for example, one form of first analysis flow path 291A.

In the first cleaning pattern, port 91 and port 95 of diverter valve 90 are connected to each other, and hence the rinse solution that flows into diverter valve 90 flows through ports 91 and 95 and cleans the ports inclusive of the flow path leading from diverter valve 90 to detector 500. In the second cleaning pattern, port 91 and ports 96 and 97 of diverter valve 90 are connected to each other, and hence the rinse solution that flows into diverter valve 90 cleans port 91 and is discharged from ports 96 and 97.

In the third cleaning pattern and the fourth cleaning pattern, the flow path including high-pressure valve 180A is set as shown in a lower left frame. A solid arrow in diverter valve 90 represents the flow path set as the third cleaning pattern and a dashed arrow in diverter valve 90 represents the flow path set as the fourth cleaning pattern.

In the third cleaning pattern and the fourth cleaning pattern, the rinse solution supplied from cleaning pump 143A to high-pressure valve 180A flows sequentially through high-pressure valve 180A, column 230A, and diverter valve 90.

The flow path for cleaning set as the third cleaning pattern and the fourth cleaning pattern corresponds to the second flow path that does not pass through needle valve 260, sample loop 192, and needle 191. The second flow path represents, for example, one form of first analysis flow path 291A.

In the third cleaning pattern, port 91 and port 95 of diverter valve 90 are connected to each other, and hence the rinse solution that flows into diverter valve 90 flows through ports 91 and 95 and cleans the ports inclusive of the flow path leading from diverter valve 90 to detector 500. In the fourth cleaning pattern, port 91 and ports 96 and 97 of diverter valve 90 are connected to each other, and hence the rinse solution that flows into diverter valve 90 cleans port 91 and is discharged from ports 96 and 97.

In the fifth cleaning pattern, the flow path including high-pressure valve 180A is set as shown in a right frame. In the fifth cleaning pattern, the rinse solution supplied from needle cleaning pump 20 to needle valve 260 flows sequentially through needle valve 260, sample loop 192, needle 191, and high-pressure valve 180A. The rinse solution that has flowed into high-pressure valve 180A is discharged from port 181A of high-pressure valve 180A.

A specific construction of the first to fifth cleaning patterns will now be described. The construction of the flow path including high-pressure valve 180A will representatively be described below.

<First Cleaning Pattern and Second Cleaning Pattern>

Figure 11:
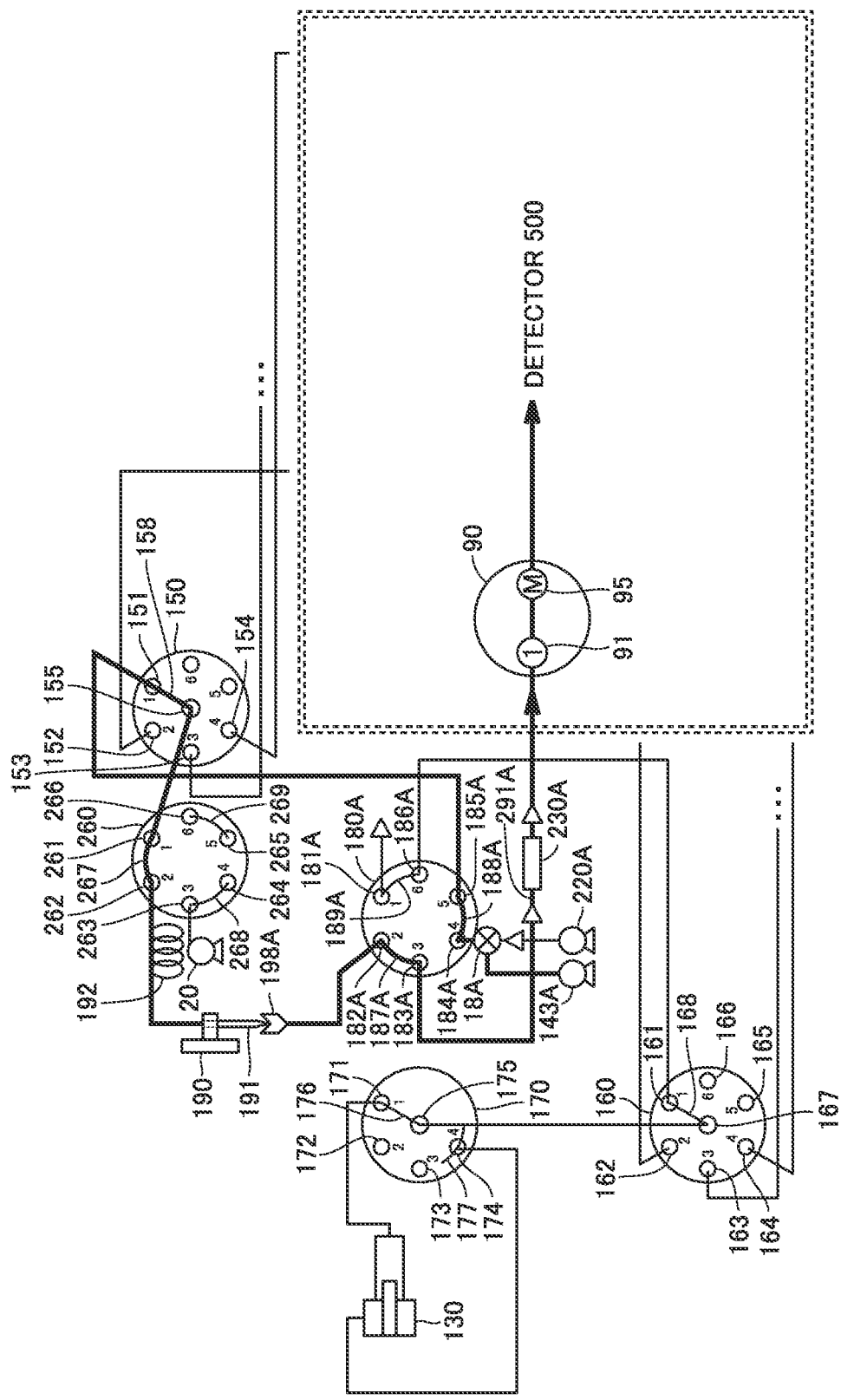
FIG. 11 is a diagram showing a specific exemplary construction of the first cleaning pattern.
Figure 12:
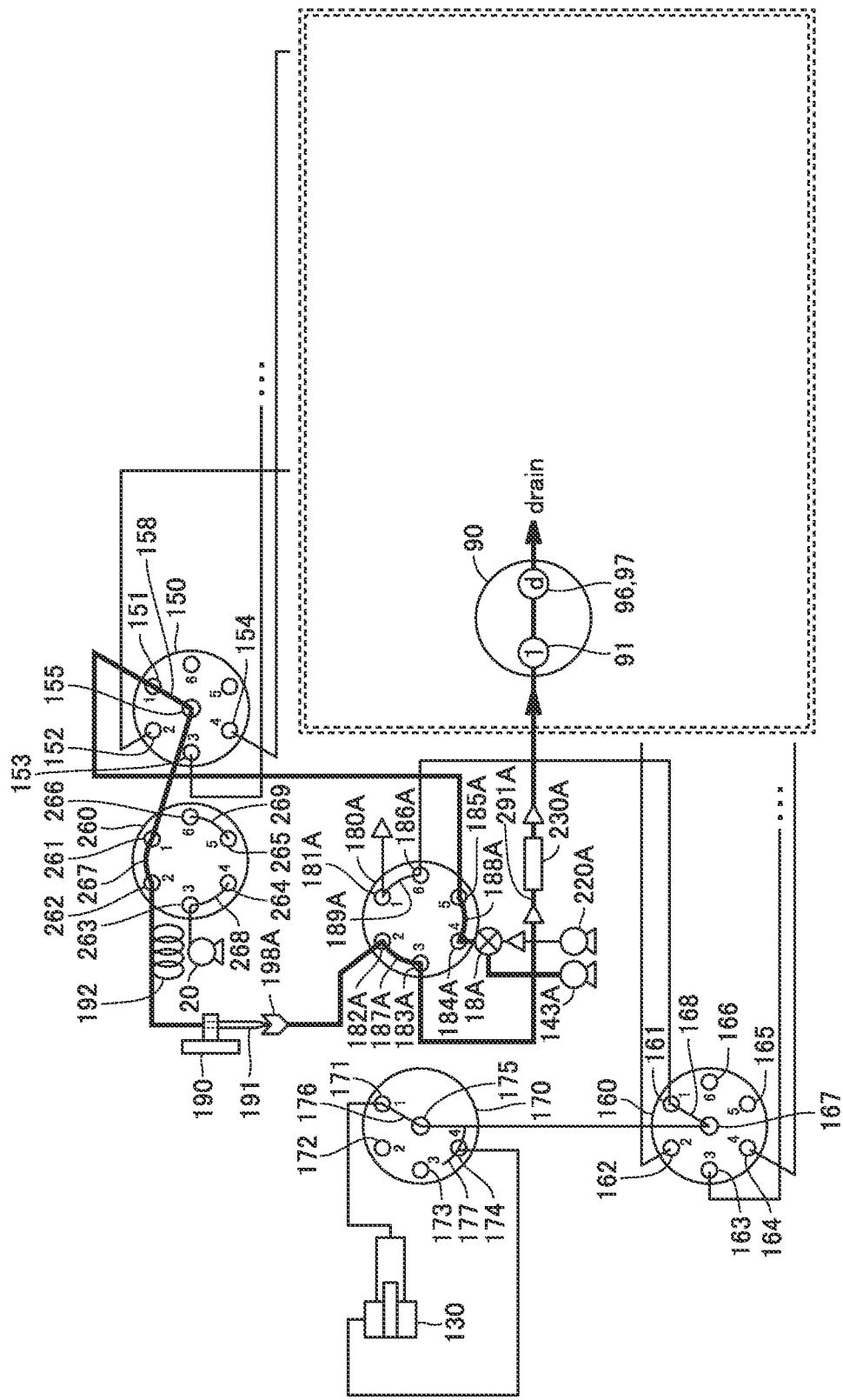
FIG. 12 is a diagram showing a specific exemplary construction of the second cleaning pattern.

FIG. 11 is a diagram showing a specific exemplary construction of the first cleaning pattern. FIG. 12 is a diagram showing a specific exemplary construction of the second cleaning pattern. FIGS. 11 and 12 do not show some of features and shows features involved with diverter valve 90 as being surrounded with a frame, which is also applicable to FIGS. 13 to 19.

In the first cleaning pattern, for example, a flow path shown in FIG. 11 is set. Specifically, port 151 and port 155 of first selector valve 150 are connected to each other. Needle 191 is connected to injection port 198A. In high-pressure valve 180A, port 182A and port 183A are connected to each other, port 184A and port 185A are connected to each other, and port 186A and port 181A are connected to each other. In diverter valve 90, port 91 and port 95 are connected to each other.

As the rinse solution is supplied from cleaning pump 143A to high-pressure valve 180A, the flow path including high-pressure valve 180A, first selector valve 150, needle valve 260, sample loop 192, needle 191, injection port 198A, high-pressure valve 180A, column 230A, and diverter valve 90 is cleaned with the rinse solution. Furthermore, the flow path leading to detector 500 is cleaned with the rinse solution. At this time, a container for a blank sample such as the rinse solution or the eluent may be prepared at sample carrier 300, the blank sample may be sucked by needle 191, and cleaning in the first cleaning pattern may be performed.

In the second cleaning pattern, for example, a flow path shown in FIG. 12 is set. The second cleaning pattern is different from the first cleaning pattern in setting of the flow path in diverter valve 90. Specifically, in the second cleaning pattern, port 91 and ports 96 and 97 of diverter valve 90 are connected to each other. Therefore, in the second cleaning pattern, the flow path leading from port 91 to ports 96 and 97 of diverter valve 90 is cleaned. At this time, a container for a blank sample such as the rinse solution or the eluent may be prepared at sample carrier 300, the blank sample may be sucked by needle 191, and cleaning in the second cleaning pattern may be performed.

<Third Cleaning Pattern and Fourth Cleaning Pattern>

Figure 13:
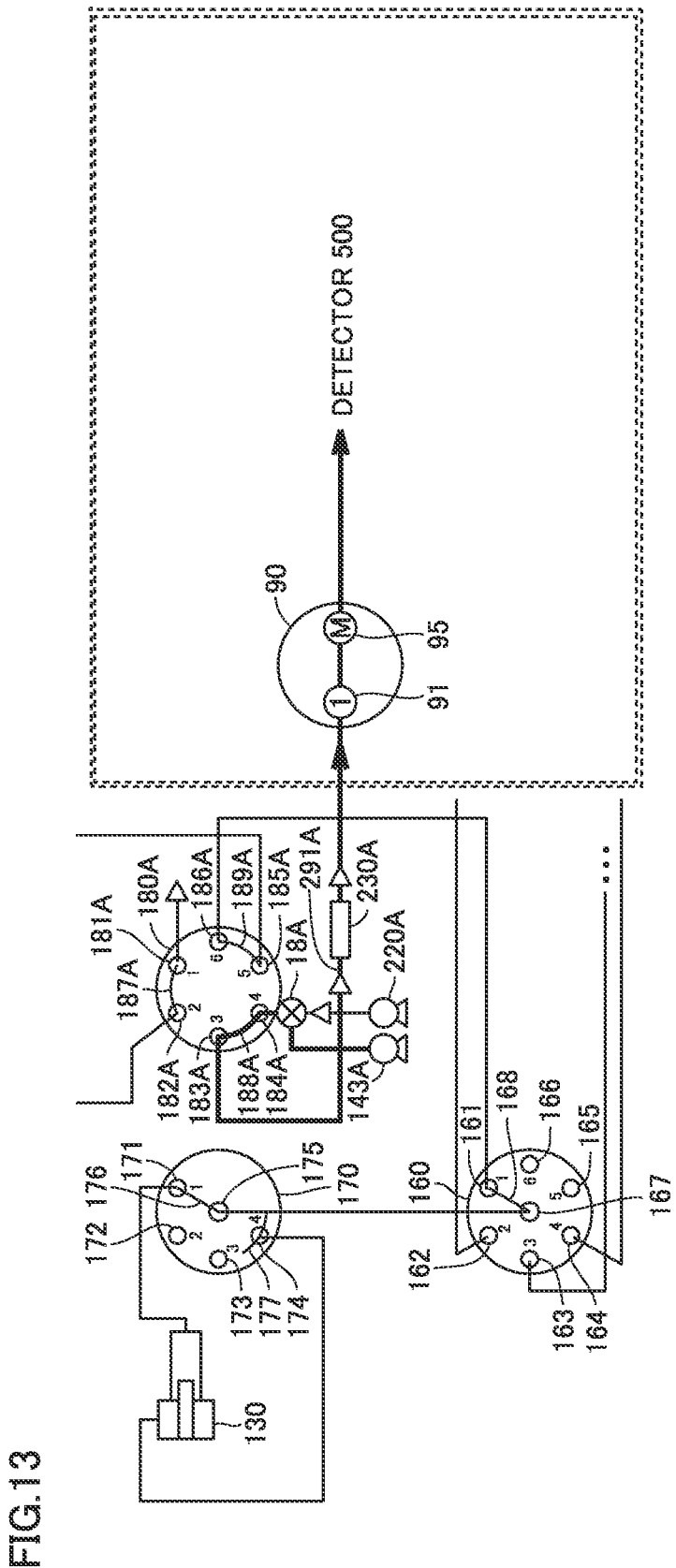
FIG. 13 is a diagram showing a specific exemplary construction of the third cleaning pattern.
Figure 14:
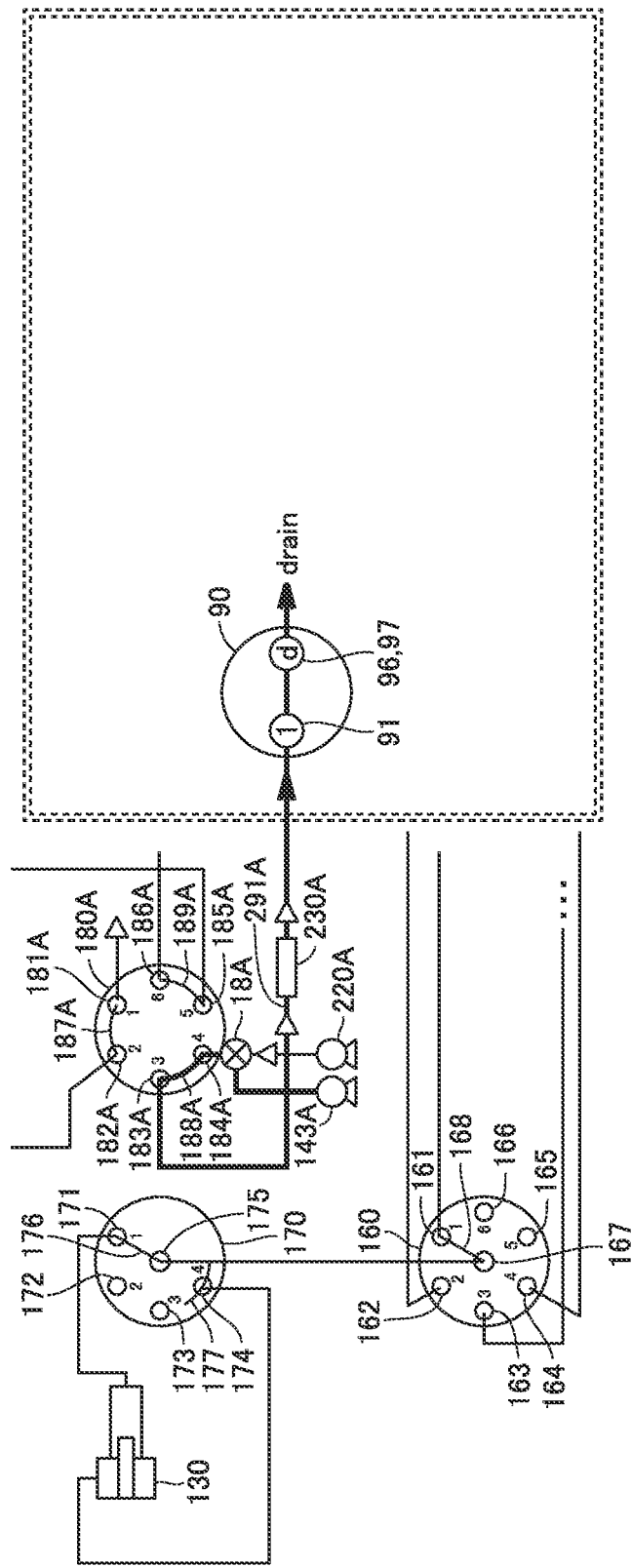
FIG. 14 is a diagram showing a specific exemplary construction of the fourth cleaning pattern.

FIG. 13 is a diagram showing a specific exemplary construction of the third cleaning pattern. FIG. 14 is a diagram showing a specific exemplary construction of the fourth cleaning pattern.

In the third cleaning pattern, for example, a flow path shown in FIG. 13 is set. Specifically, port 181A and port 182A of high-pressure valve 180A are connected to each other, port 183A and port 184A are connected to each other, and port 185A and port 186A are connected to each other. In diverter valve 90, port 91 and port 95 are connected to each other.

The rinse solution supplied from cleaning pump 143A to high-pressure valve 180A flows to column 230A without flowing to needle 191. Consequently, diverter valve 90 and the flow path leading from diverter valve 90 to detector 500 are cleaned with the rinse solution.

In the fourth cleaning pattern, for example, a flow path shown in FIG. 14 is set. The fourth cleaning pattern is different from the third cleaning pattern in setting of the flow path in diverter valve 90. Specifically, in the fourth cleaning pattern, port 91 and ports 96 and 97 of diverter valve 90 are connected to each other. Therefore, in the fourth cleaning pattern, the flow path leading from port 91 to ports 96 and 97 of diverter valve 90 is cleaned.

<Fifth Cleaning Pattern>

Figure 15:
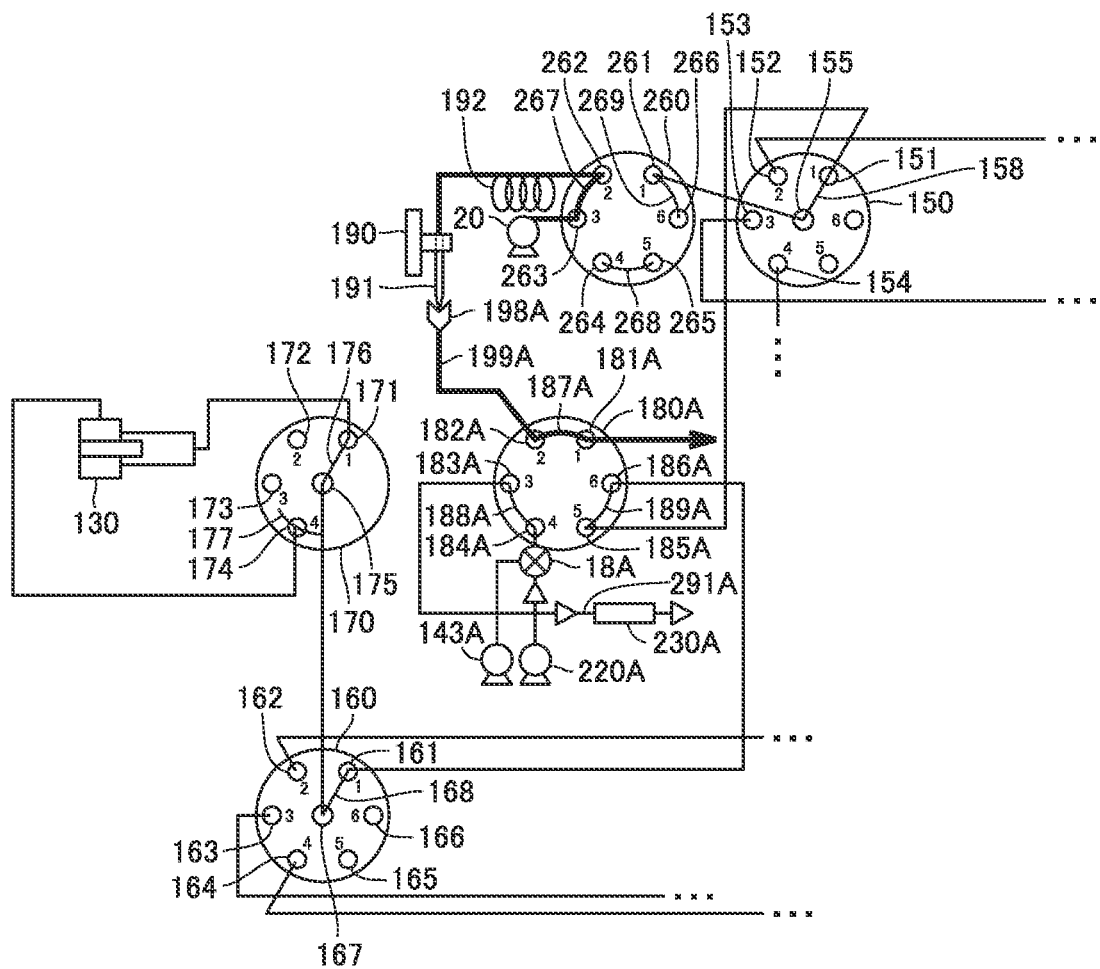
FIG. 15 is a diagram showing a specific exemplary construction of the fifth cleaning pattern.

FIG. 15 is a diagram showing a specific exemplary construction of the fifth cleaning pattern.

In the fifth cleaning pattern, for example, a flow path shown in FIG. 15 is set. Specifically, port 262 and port 263 of needle valve 260 are connected to each other, port 264 and port 265 are connected to each other, and port 266 and port 261 are connected to each other. Port 181A and port 182A of high-pressure valve 180A are connected to each other, port 183A and port 184A are connected to each other, and port 185A and port 186A are connected to each other.

As the rinse solution is supplied from needle cleaning pump 20 to needle valve 260, the flow path including sample loop 192, needle 191, injection port 198A, and high-pressure valve 180A is cleaned with the rinse solution. At this time, a container for a blank sample such as the rinse solution or the eluent may be prepared at sample carrier 300, the blank sample may be sucked by needle 191, and cleaning in the fifth cleaning pattern may be performed.

As described above, according to the first cleaning pattern and the second cleaning pattern, not only the flow path from column 230A to diverter valve 90 but also the flow path including needle 191 and sample loop 192 can be cleaned.

The third cleaning pattern and the fourth cleaning pattern are smaller in range of cleaning than the first cleaning pattern and the second cleaning pattern. Not including needle 191 and sample loop 192 in the third cleaning pattern and the fourth cleaning pattern, however, produces an effect of increase in variation of the cleaning method. Specifically, by making use of the third cleaning pattern and the fourth cleaning pattern, the flow path can be cleaned at timing of suction of the sample into needle 191 and sample loop 192.

According to the first cleaning pattern and the third cleaning pattern, the flow path leading to detector 500, inclusive of port 95 of diverter valve 90, can be cleaned. Such a cleaning pattern is effective, for example, in an example in which a sample at a high concentration is analyzed or in a construction in which analysis can continue with switching among a plurality of analysis flow paths (first analysis flow path 291A to fourth analysis flow path 291D) being made as in liquid chromatographic system 10 according to the present embodiment.

When analysis continues with switching among a plurality of analysis flow paths being made, a component in the sample may be accumulated in diverter valve 90 that switches among the analysis flow paths. In particular, the component in the sample may repeatedly be accumulated at port 95 in diverter valve 90 to which detector 500 is connected and carryover may occur. Alternatively, since the sample is continuously sent to an interface portion of detector 500 through diverter valve 90, carryover may occur in that interface portion.

According to the first cleaning pattern and the third cleaning pattern, port 95 of diverter valve 90, inclusive of the interface portion of detector 500, can be cleaned. Therefore, while efficient analysis through a plurality of analysis flow paths is conducted, a portion which will be a factor for occurrence of carryover can sufficiently be cleaned.

An example in which the flow path is cleaned with the rinse solution is described with reference to FIGS. 10 to 15. In the first to fifth cleaning patterns, however, the flow path may be cleaned with the eluent (blank solution). For example, with the use of high-pressure pump 220A instead of cleaning pump 143A in the first to fourth cleaning patterns, cleaning with the eluent may be performed. In the fifth cleaning pattern, by connection of needle cleaning pump 20 to the container where the eluent is accommodated, cleaning with the eluent may be performed. Furthermore, in the first to fifth cleaning patterns, cleaning with the rinse solution and the eluent as being combined may be performed. For example, after the flow path is cleaned with the rinse solution, the flow path may be cleaned with the eluent.

The first to fifth cleaning patterns are described with reference to the example in which the flow path includes high-pressure valve 180A. In liquid chromatographic system 10, however, the flow paths including respective high-pressure valves 180B to 180D can naturally be cleaned similarly in the first to fifth cleaning patterns. The description above is similarly applicable also to the flow paths including respective high-pressure valves 180B to 180D.

An example in which the flow path defined in liquid chromatographic system 10 is cleaned in various cleaning patterns while a sample is being analyzed or preparation for analysis is being made in one of first analysis flow path 291A to fourth analysis flow path 291D will now be described with reference to FIGS. 16 to 19.

<Example of Cleaning During Suction of Sample>

Figure 16:
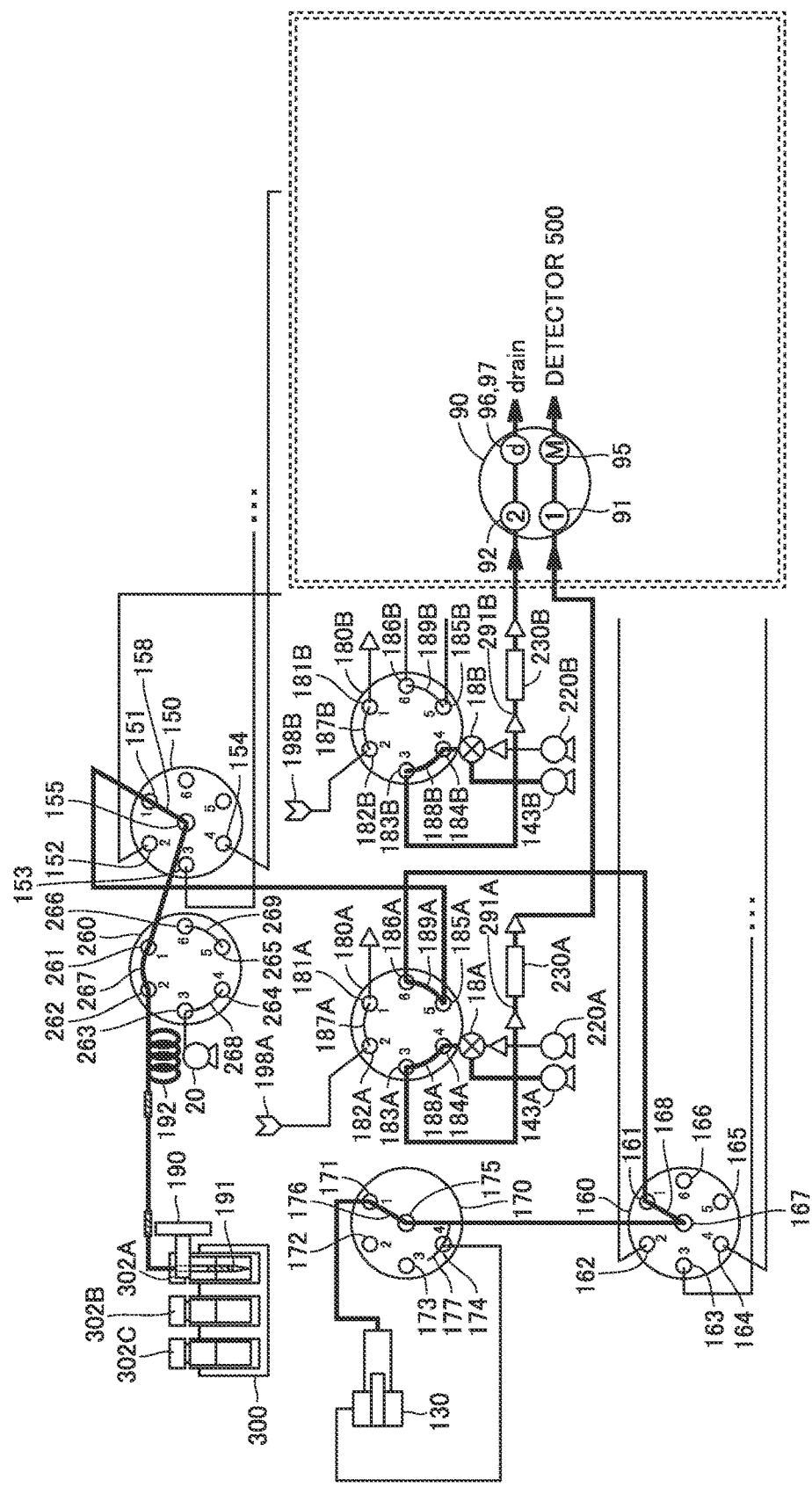
FIG. 16 is a diagram showing an example in which a flow path is cleaned in the third cleaning pattern and the fourth cleaning pattern during suction of the sample.

FIG. 16 is a diagram showing an example in which a flow path is cleaned in the third cleaning pattern and the fourth cleaning pattern during suction of the sample. In particular, an example in which, during suction of the sample, first analysis flow path 291A is cleaned in the third cleaning pattern and second analysis flow path 291B is cleaned in the fourth cleaning pattern will be described.

In FIG. 16, first selector valve 150 and second selector valve 160 are connected to high-pressure valve 180A. In diverter valve 90, port 91 leading to column 230A and port 95 leading to detector 500 are connected to each other. Therefore, the sample is ready for analysis through first analysis flow path 291A including high-pressure valve 180A.

Metering pump 130 is connected to needle 191 with low-pressure valve 170, second selector valve 160, high-pressure valve 180A, first selector valve 150, and needle valve 260 being interposed. Needle 191 is guided to container 302A where the sample is accommodated. Needle 191 sucks the sample from container 302A by application of a negative pressure by metering pump 130.

In high-pressure valve 180B, port 183B and port 184B are connected to each other.

In such a state, liquid chromatographic system 10 can perform cleaning in the third cleaning pattern targeted for first analysis flow path 291A including high-pressure valve 180A and cleaning in the fourth cleaning pattern targeted for second analysis flow path 291B including high-pressure valve 180B.

The rinse solution supplied from cleaning pump 143A to high-pressure valve 180A flows through high-pressure valve 180A, column 230A, and diverter valve 90, and cleans those portions and the flow path leading to detector 500 (third cleaning pattern).

The rinse solution supplied from cleaning pump 143B to high-pressure valve 180B flows through high-pressure valve 180B, column 230B, and diverter valve 90, and cleans the flow path including those portions (fourth cleaning pattern).

Liquid chromatographic system 10 can thus clean first analysis flow path 291A while an operation to suction the sample continues for analysis of the sample through first analysis flow path 291A. Furthermore, liquid chromatographic system 10 can clean second analysis flow path 291B. Liquid chromatographic system 10 can naturally clean third analysis flow path 291C including high-pressure valve 180C and fourth analysis flow path 291D including high-pressure valve 180D together.

<Example of Cleaning During Injection of Sample>

Figure 17:
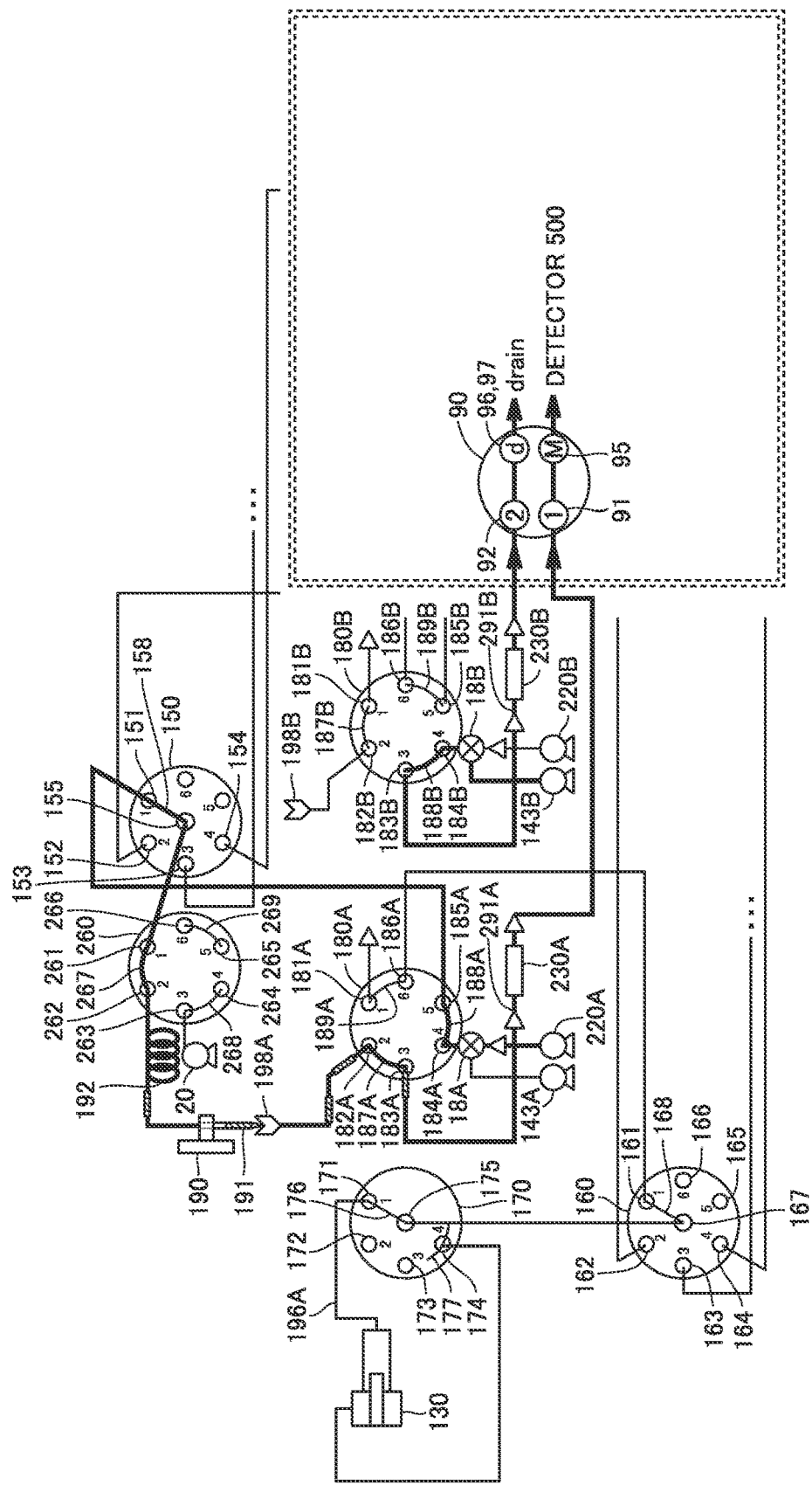
FIG. 17 is a diagram showing an example in which the flow path is cleaned in the fourth cleaning pattern during injection of the sample.

FIG. 17 is a diagram showing an example in which the flow path is cleaned in the fourth cleaning pattern during injection of the sample. In particular, an example in which second analysis flow path 291B is cleaned in the fourth cleaning pattern while the sample is injected into column 230A in first analysis flow path 291A will be described.

In FIG. 17, first selector valve 150 and second selector valve 160 are connected to high-pressure valve 180A. In diverter valve 90, port 91 leading to column 230A and port 95 leading to detector 500 are connected to each other.

High-pressure pump 220A is connected to needle 191 with high-pressure valve 180A, first selector valve 150, and needle valve 260 being interposed. Needle 191 is connected to injection port 198A. The sample is held in sample loop 192. Needle 191 injects the sample in sample loop 192 into injection port 198A, together with the eluent supplied from high-pressure pump 220A. The sample is thus injected into column 230A through high-pressure valve 180A.

In high-pressure valve 180B, port 183B and port 184B are connected to each other.

In such a state, liquid chromatographic system 10 can perform cleaning in the fourth cleaning pattern targeted for second analysis flow path 291B including high-pressure valve 180B. Specifically, by supply of the rinse solution from cleaning pump 143B to high-pressure valve 180B, the flow path including high-pressure valve 180B, column 230B, and diverter valve 90 can be cleaned (fourth cleaning pattern).

Thus, liquid chromatographic system 10 can clean second analysis flow path 291B while an operation to inject the sample into column 230A in first analysis flow path 291A continues. Liquid chromatographic system 10 can naturally clean third analysis flow path 291C including high-pressure valve 180C and fourth analysis flow path 291D including high-pressure valve 180D together.

<First Example of Cleaning During Analysis of Sample>

Figure 18:
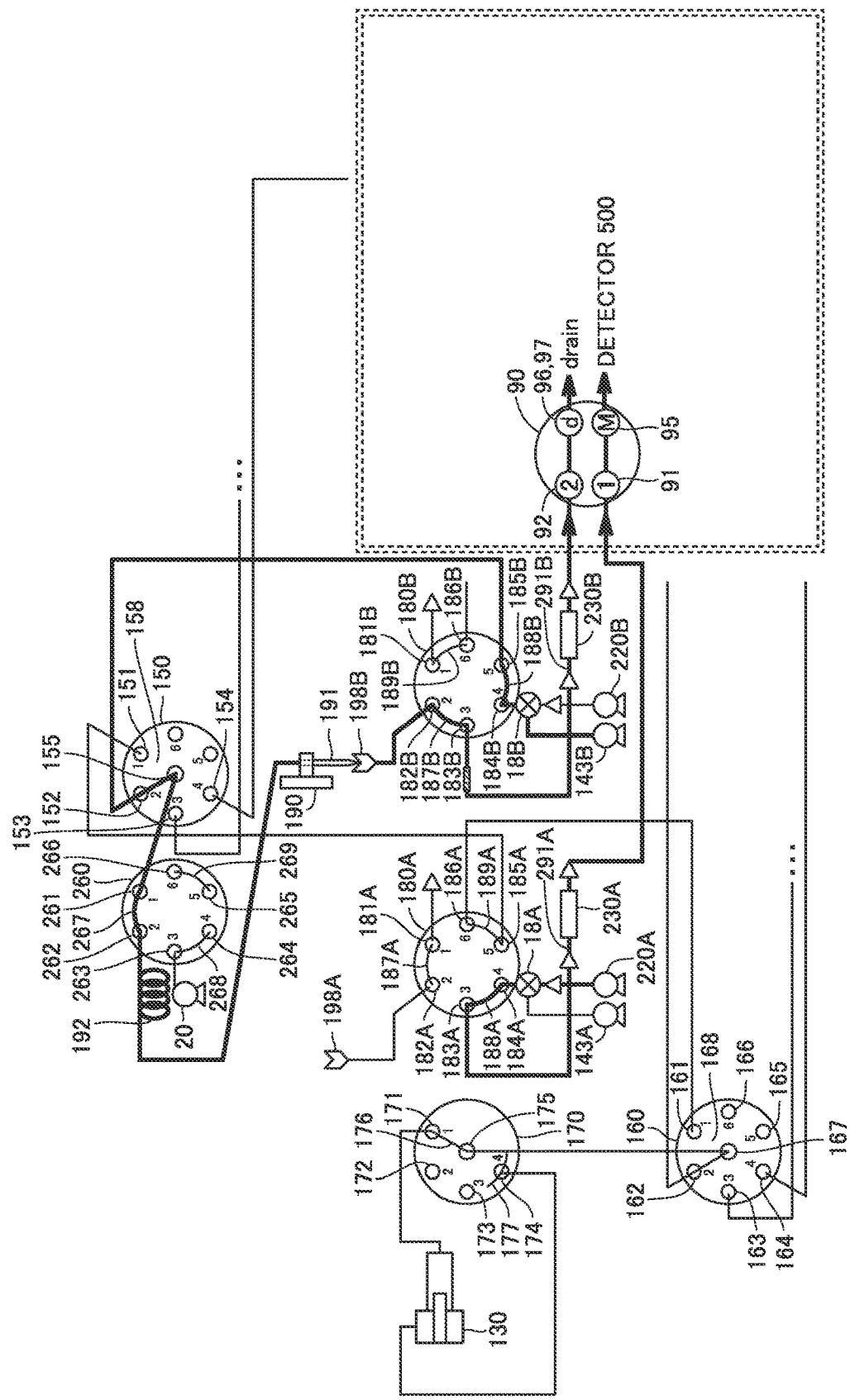
FIG. 18 is a diagram showing an example in which the flow path is cleaned in the second cleaning pattern during analysis of the sample.

FIG. 18 is a diagram showing an example in which the flow path is cleaned in the second cleaning pattern during analysis of the sample. In particular, an example in which second analysis flow path 291B is cleaned in the second cleaning pattern while the sample is being analyzed through first analysis flow path 291A will be described.

In FIG. 18, high-pressure pump 220A is connected to column 230A via high-pressure valve 180A. The sample is accommodated in column 230A. In diverter valve 90, port 91 leading to column 230A and port 95 leading to detector 500 are connected to each other. The eluent supplied from high-pressure pump 220A is injected through high-pressure valve 180A into column 230A where the sample is accommodated. In detector 500, analysis of the sample proceeds.

First selector valve 150 and second selector valve 160 are connected to high-pressure valve 180B. Cleaning pump 143B is connected to needle 191 with high-pressure valve 180B, first selector valve 150, and needle valve 260 being interposed. Needle 191 is guided to injection port 198B.

In such a state, liquid chromatographic system 10 can perform cleaning in the second cleaning pattern targeted for second analysis flow path 291B including high-pressure valve 180B. Specifically, by supply of the rinse solution from cleaning pump 143B to high-pressure valve 180B, the rinse solution flows sequentially through high-pressure valve 180B, first selector valve 150, needle valve 260, sample loop 192, needle 191, injection port 198B, high-pressure valve 180B, column 230B, and diverter valve 90, and the flow path including those portions is cleaned (second cleaning pattern).

Thus, liquid chromatographic system 10 can clean second analysis flow path 291B in the second cleaning pattern while analysis of the sample proceeds in first analysis flow path 291A. Liquid chromatographic system 10 can naturally clean, instead of second analysis flow path 291B, third analysis flow path 291C including high-pressure valve 180C or fourth analysis flow path 291D including high-pressure valve 180D in the second cleaning pattern.

Liquid chromatographic system 10 can also clean second analysis flow path 291B in the fourth pattern while analysis of the sample proceeds in first analysis flow path 291A. Furthermore, while analysis of the sample proceeds in first analysis flow path 291A, liquid chromatographic system 10 can clean second analysis flow path 291B in the second cleaning pattern and also third analysis flow path 291C in the fourth cleaning pattern.

<Second Example of Cleaning During Analysis of Sample>

Figure 19:
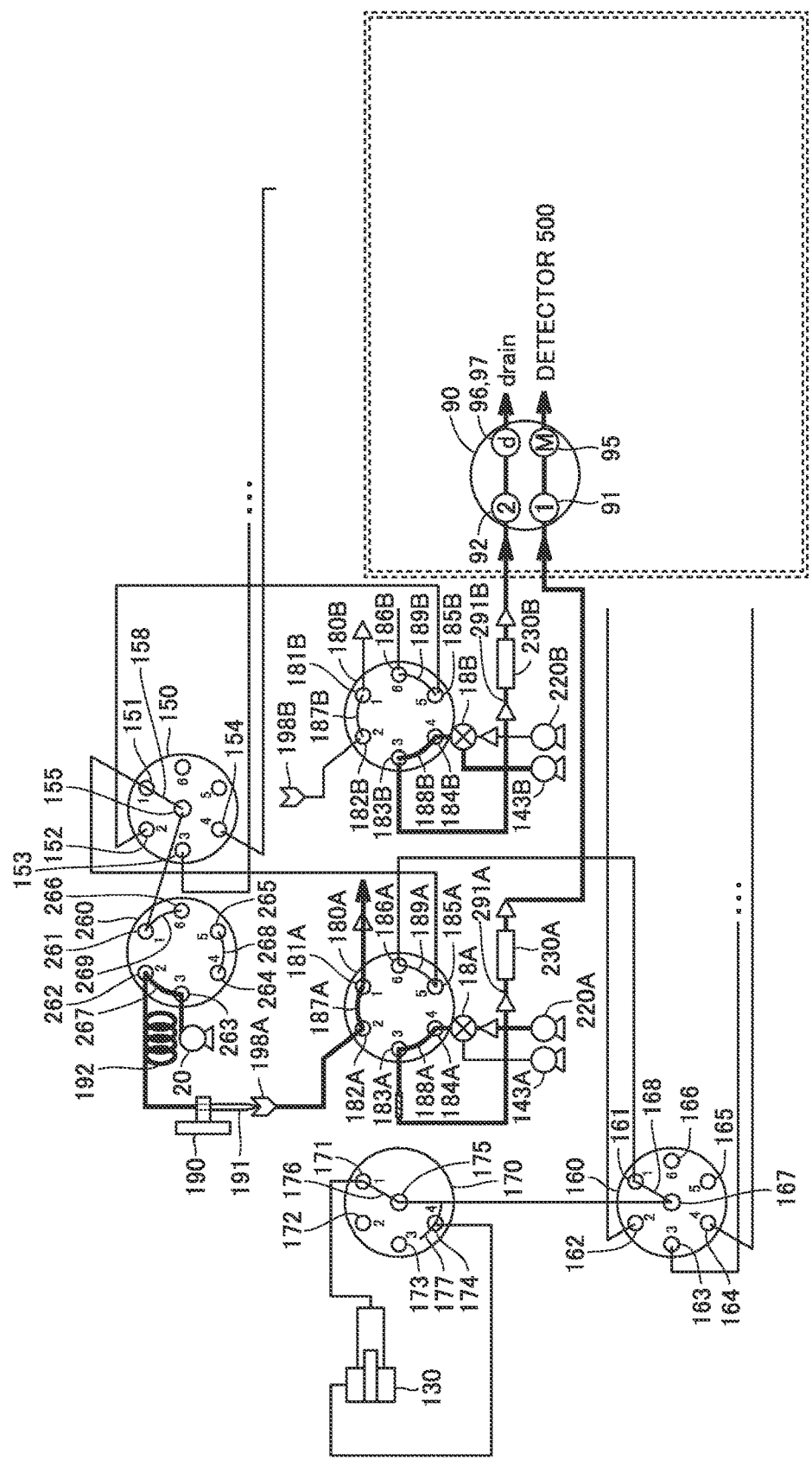
FIG. 19 is a diagram showing an example in which the flow path is cleaned in the fourth cleaning pattern and the fifth cleaning pattern during analysis of the sample.

FIG. 19 is a diagram showing an example in which the flow path is cleaned in the fourth cleaning pattern and the fifth cleaning pattern during analysis of the sample. In particular, an example in which second analysis flow path 291B is cleaned in the fourth cleaning pattern and the flow path including high-pressure valve 180A is cleaned in the fifth cleaning pattern while the sample is being analyzed through first analysis flow path 291A will be described.

In FIG. 19, first selector valve 150 and second selector valve 160 are connected to high-pressure valve 180A. In diverter valve 90, port 91 leading to column 230A and port 95 leading to detector 500 are connected to each other. The eluent supplied from high-pressure pump 220A is injected through high-pressure valve 180A into column 230A where the sample is accommodated. In detector 500, analysis of the sample proceeds.

In needle valve 260, port 262 and port 263 are connected to each other. In high-pressure valve 180B, port 183B and port 184B are connected to each other.

In such a state, liquid chromatographic system 10 can perform cleaning in the fifth cleaning pattern targeted for the flow path including high-pressure valve 180A and cleaning in the fourth cleaning pattern targeted for second analysis flow path 291B including high-pressure valve 180B.

The rinse solution supplied from needle cleaning pump 20 to needle valve 260 flows through needle valve 260, sample loop 192, needle 191, and high-pressure valve 180A and the flow path including those portions is cleaned (fifth cleaning pattern).

The rinse solution supplied from cleaning pump 143B to high-pressure valve 180B flows through high-pressure valve 180B, column 230B, and diverter valve 90 and the flow path including those portions is cleaned (fourth cleaning pattern).

Thus, liquid chromatographic system 10 can perform cleaning in the fifth cleaning pattern targeted for the flow path including high-pressure valve 180A and cleaning in the fourth cleaning pattern targeted for second analysis flow path 291B including high-pressure valve 180B while processing for analyzing the sample through first analysis flow path 291A continues.

Liquid chromatographic system 10 can naturally clean third analysis flow path 291C including high-pressure valve 180C and fourth analysis flow path 291D including high-pressure valve 180D together in the fourth cleaning pattern.

<Types of Selectable Cleaning Patterns>

FIG. 20 is a diagram showing a cleaning pattern that can be selected for first analysis flow path 291A to fourth analysis flow path 291D. FIG. 20 shows, for each of first analysis flow path 291A to fourth analysis flow path 291D, types of selectable cleaning patterns in each stage of three processes that proceed with the use of first analysis flow path 291A.

Various cleaning patterns described so far with reference to FIGS. 10 to 19 are summarized. For example, while first analysis flow path 291A is being used for analysis of the sample, types of selectable cleaning patterns for cleaning of first analysis flow path 291A to fourth analysis flow path 291D are as shown in FIG. 20.

The flow path cleaned in the fifth cleaning pattern is the flow path through which the cleaning solution flows toward ports 181A to 184A which are drain ports of high-pressure valves 180A to 180D. FIG. 20 shows the fifth cleaning pattern in correspondence with first analysis flow path 291A to fourth analysis flow path 291D, as the cleaning pattern relating to first analysis flow path 291A to fourth analysis flow path 291D.

Stages of sample suction, sample injection, and eluent injection shown in FIG. 20 mean a stage of suction of the sample by needle 191, a stage of injection of the sucked sample from needle 191 via injection port 198A and high-pressure valve 180A into column 230A, and a stage of injection of the eluent supplied from high-pressure pump 220A to high-pressure valve 180A into column 230A, respectively.

While the sample is being sucked by needle 191, first analysis flow path 291A to fourth analysis flow path 291D can be cleaned in the third or fourth cleaning pattern. For example, first analysis flow path 291A can be cleaned in the third cleaning pattern and second analysis flow path 291B to fourth analysis flow path 291D can be cleaned in the third cleaning pattern.

While the sucked sample is being injected from needle 191 via injection port 198A and high-pressure valve 180A into column 230A, second analysis flow path 291B to fourth analysis flow path 291D can be cleaned in the third or fourth cleaning pattern. For example, second analysis flow path 291B can be cleaned in the third cleaning pattern and third analysis flow path 291C and fourth analysis flow path 291D can be cleaned in the fourth cleaning pattern.

While the eluent supplied from high-pressure pump 220A to high-pressure valve 180A is being injected into column 230A, first analysis flow path 291A can be cleaned in the fifth cleaning pattern. A portion cleaned at this time includes the needle valve, sample loop 192, needle 191, injection port 198A, port 182A of high-pressure valve 180A, and port 181A of high-pressure valve 180A.

While the eluent supplied from high-pressure pump 220A to high-pressure valve 180A is being injected into column 230A, second analysis flow path 291B to fourth analysis flow path 291D can be cleaned in any one of the second, fourth, and fifth cleaning patterns. For example, second analysis flow path 291B can be cleaned in the second cleaning pattern and third analysis flow path 291C and fourth analysis flow path 291D can be cleaned in the fourth cleaning pattern.

Liquid chromatographic system 10 can thus clean first analysis flow path 291A to fourth analysis flow path 291D in various cleaning patterns. Liquid chromatographic system 10 accepts input of the cleaning pattern to be used for cleaning of each analysis flow path and timing of cleaning.

A user sets the cleaning pattern to be used for cleaning of each analysis flow path and timing of cleaning, with the use of input device 120 (see FIG. 4). Contents of setting are shown on display device 125 (see FIG. 4). Controller 110 (see FIG. 4) sets the cleaning pattern to be used for cleaning of each analysis flow path and timing of cleaning in accordance with an instruction from the user provided to input device 120.

<Exemplary Setting for Cleaning Pattern>

FIG. 21 is a timing chart showing exemplary setting for the cleaning pattern. In FIG. 21, (1) to (5) mean the first to fifth cleaning patterns, respectively. A flow of processing performed by liquid chromatographic system 10 in accordance with the cleaning pattern and the timing of cleaning set in accordance with an instruction from the user will be described with reference to FIG. 21.

Analysis of the sample is conducted with successive use of first analysis flow path 291A to fourth analysis flow path 291D. Initially, first analysis flow path 291A is cleaned in the first cleaning pattern. Thus, the flow path including high-pressure valve 180A, first selector valve 150, needle valve 260, sample loop 192, needle 191, injection port 198A, high-pressure valve 180A, column 230A, and diverter valve 90 is cleaned with the rinse solution. Furthermore, the flow path leading from diverter valve 90 to detector 500 is cleaned with the rinse solution.

Then, the sample is sucked by needle 191 in first analysis flow path 291A. While the sample is sucked by needle 191, second analysis flow path 291B to fourth analysis flow path 291D are cleaned in the fourth cleaning pattern. Thus, for example, in second analysis flow path 291B, the flow path leading from high-pressure valve 180B to column 230B and the flow path leading from column 230B to ports 96 and 97 of diverter valve 90 are cleaned.

As suction of the sample in first analysis flow path 291A ends, processing for injecting the sample together with the eluent into column 230A is performed. As all the sample is injected from needle 191, cleaning in the fifth cleaning pattern is performed. The flow path including needle valve 260, sample loop 192, needle 191, injection port 198A, and high-pressure valve 180A is thus cleaned.

As all the sample is injected from needle 191 in first analysis flow path 291A, the state of connection of high-pressure valve 180A is switched and processing for feeding the eluent to the sample injected into column 230A is started. Analysis thus proceeds in detector 500.

While analysis proceeds in first analysis flow path 291A, cleaning in the second cleaning pattern is performed in the order of second analysis flow path 291B to fourth analysis flow path 291D. When analysis ends in first analysis flow path 291A, first analysis flow path 291A is cleaned in the second cleaning pattern and in the third cleaning pattern.

Then, processing for analyzing the sample through second analysis flow path 291B is started. Specifically, an object to which first selector valve 150 and second selector valve 160 are connected is switched from high-pressure valve 180A to high-pressure valve 180B. In succession, second analysis flow path 291B is cleaned in the first cleaning pattern.

Hereafter, as shown in FIG. 21, in a similar procedure, processing for analyzing the sample through second analysis flow path 291B to fourth analysis flow path 291D and processing for cleaning first analysis flow path 291A to fourth analysis flow path 291D are repeated.

<Cleaning With Rinse Solution and Eluent as Being Combined>

Figure 22:
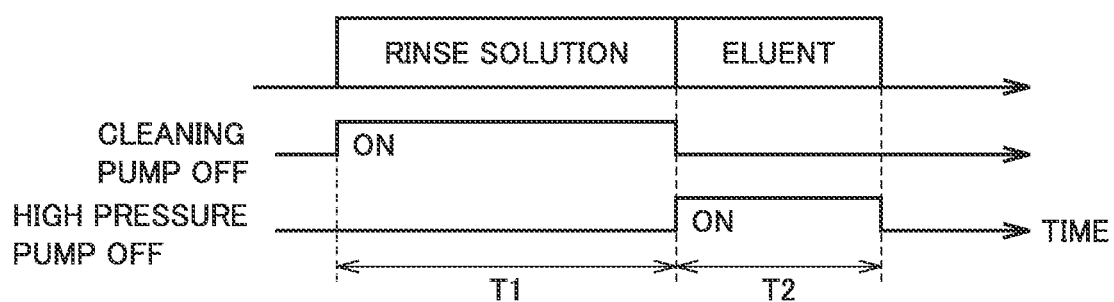
FIG. 22 is a timing chart showing an exemplary pattern of driving a cleaning pump and a high-pressure pump.

FIG. 22 is a timing chart showing an exemplary pattern of driving cleaning pumps 143A to 143D and high-pressure pumps 220A to 220D. Liquid chromatographic system 10 can use the rinse solution and the eluent (blank solution) as the cleaning solution in cleaning of the flow path in the first to fourth cleaning patterns.

For example, in cleaning of first analysis flow path 291A, initially, cleaning pump 143A is driven. The first analysis flow path is thus cleaned with the rinse solution. At a time point of lapse of time T1 since drive of cleaning pump 143A, high-pressure pump 220A instead of cleaning pump 143A is driven. The first analysis flow path is thus cleaned with the eluent. At a time point of lapse of time T2 since drive of high-pressure pump 220A, drive of high-pressure pump 220A is stopped.

According to such a drive pattern, after cleaning with the rinse solution, the eluent flows. Therefore, the mobile phase composed of the eluent can be in equilibrium in columns 230A to 230D. Such a drive pattern may be adopted in all of the first to fourth cleaning patterns. For example, in setting for the cleaning pattern shown in FIG. 21, the rinse solution and the eluent as shown in FIG. 22 may be combined with each other.

Though drive of high-pressure pump 220A is stopped at the time point of lapse of time T2 since drive of high-pressure pump 220A, drive of high-pressure pump 220A does not have to be stopped but high-pressure pump 220A may constantly be driven except for when the rinse solution is supplied from cleaning pump 143A.

<Flowchart (Cleaning in Each Cleaning Pattern)>

Figure 23:
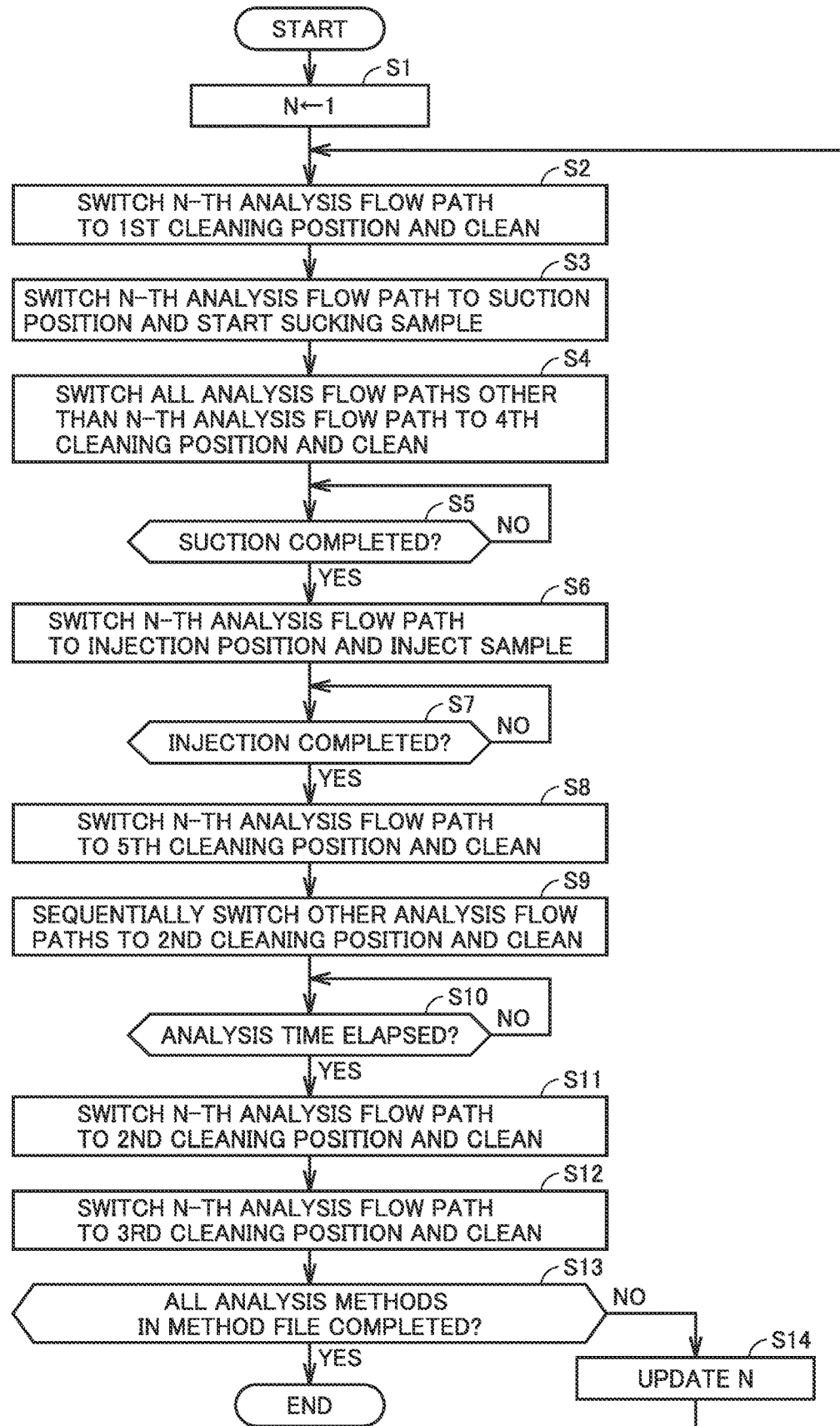
FIG. 23 is a flowchart showing contents of processing performed by a controller based on the setting shown in FIG. 21.

FIG. 23 is a flowchart showing contents of processing performed by controller 110 based on the setting shown in FIG. 21.

Initially, controller 110 sets a variable N to 1 (step S1). Then, controller 110 switches an Nth analysis flow path to a first cleaning position and has the Nth analysis flow path cleaned (step S2). Thus, first analysis flow path 291A is initially cleaned in the first cleaning pattern.

Then, controller 110 switches the Nth analysis flow path to a suction position and the sample is sucked by needle 191 (step S3). Then, controller 110 switches all analysis flow paths other than the Nth analysis flow path to a fourth cleaning position and has the all analysis flow paths cleaned (step S4). Thus, for example, first analysis flow path 291A is switched to the suction position and second analysis flow path 291B to fourth analysis flow path 291D are cleaned in the fourth cleaning pattern.

Then, controller 110 determines whether or not suction of the sample has been completed (step S5). More specifically, the controller determines whether or not a prescribed time period has elapsed since processing in step S3. Controller 110 repeats determination in step S5 until it determines that suction of the sample has been completed. When controller 110 determines that suction of the sample has been completed, it switches the Nth analysis flow path to an injection position and has the sample injected (step S6). Thus, the sample is injected into column 230A, for example, in first analysis flow path 291A.

Then, controller 110 determines whether or not injection of the sample has been completed (step S7). More specifically, the controller determines whether or not a prescribed time period has elapsed since processing in step S6. Controller 110 repeats determination in step S7 until it determines that injection of the sample has been completed. When controller 110 determines that injection of the sample has been completed, it switches the Nth analysis flow path to a fifth cleaning position and has the Nth analysis flow path cleaned (step S8). Thus, for example, first analysis flow path 291A is cleaned in the fifth cleaning pattern. Furthermore, controller 110 switches analysis flow paths other than the Nth analysis flow path successively to a second cleaning position and has other analysis flow paths cleaned (step S9). Thus, for example, second analysis flow path 291B to fourth analysis flow path 291D are successively cleaned in the third cleaning pattern.

Then, controller 110 determines whether or not predetermined analysis time has elapsed (step S10). Controller 110 repeats determination in step S10 until it determines that the analysis time has elapsed. When the analysis time has elapsed, controller 110 successively switches the Nth analysis flow path to the second cleaning position and a third cleaning position and has the Nth analysis flow path cleaned (steps S11 and S12). Thus, for example, first analysis flow path 291A is cleaned successively in the second cleaning pattern and the third cleaning pattern.

Then, controller 110 determines whether or not all analysis methods in a method file have been completed (step S13). A schedule for analysis of the sample through the first to fourth analysis flow paths is stored as a method file in controller 110. The method file includes also the cleaning pattern and the timing of cleaning.

When controller 110 determines that all the analysis methods in the method file have not been completed, it updates variable N (step S14). Thus, for example, the analysis flow path to be used for analysis of the sample is updated from first flow path 291A to second analysis flow path 291B. Thereafter, the controller has the process return to processing in step S2. When controller 110 determines that all the analysis methods in the method file have been completed, it quits the process based on the present flowchart.

<Flowchart (Setting for Cleaning Pattern)>

Figure 24:
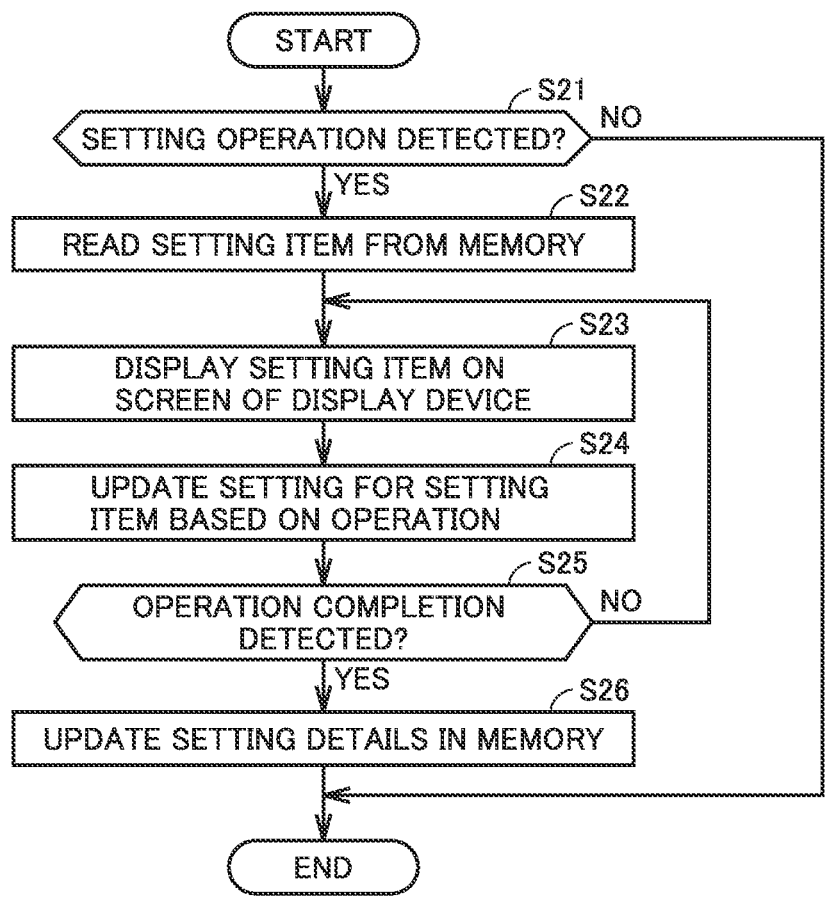
FIG. 24 is a flowchart showing contents of processing relating to setting for the cleaning pattern.

FIG. 24 is a flowchart showing contents of processing relating to setting for the cleaning pattern. Processing based on the present flowchart is performed by controller 110.

Initially, controller 110 determines whether or not it detects an operation for setting (step S21). For example, controller 110 determines whether or not it detects an operation for making setting through input device 120. When the controller does not detect an operation for setting, the process based on the present flowchart ends.

When controller 110 detects the operation for setting, it reads a setting item from memory 112 (step S22). The setting item includes a sample analysis schedule and the cleaning pattern for each of first analysis flow path 291A to fourth analysis flow path 291D. Then, controller 110 has the read setting item displayed on a screen of display device 125 (step S23).

Then, controller 110 updates setting for the setting item in accordance with an operation by the user (step S24). Contents set in accordance with the operation by the user include also the cleaning pattern and a condition for cleaning in that cleaning pattern. The condition for cleaning includes a time period for cleaning, the number of times of cleaning, and a type of the cleaning solution. Through processing in step S24, the sample analysis schedule and the cleaning pattern are updated for each of first analysis flow path 291A to fourth analysis flow path 291D. Consequently, a method file for new analysis is generated.

Then, controller 110 determines whether or not it detects completion of the operation by the user (step S25). When controller 110 does not detect completion of the operation by the user, the process returns to step S23. When controller 110 detects completion of the operation by the user, it updates setting in memory 112 to contents in step S24 (step S26) and quits the process based on the present flowchart.

<Setting Screen>

FIG. 25 is a diagram showing an exemplary setting screen for automatic cleaning. Controller 110 has a setting item shown on the screen of display device 125 (see FIG. 4) when it accepts an operation for changing setting for automatic cleaning of the flow path. Consequently, a setting screen for automatic cleaning of the flow path including first analysis flow path 291A to fourth analysis flow path 291 is shown on display device 125 (see FIG. 4).

FIG. 25 exemplifies a setting screen 400. The user can set an analysis flow path (stream) to be cleaned, the cleaning pattern, and the type of the cleaning solution while the user looks at setting screen 400. For example, when the user operates any one of a plurality of setting items with a mouse or the like, a window for the setting item corresponding to the operation opens in setting screen 400. The user can input a desired setting value in the opened window. For example, in setting screen 400, a window 404 that opens in response to an operation to select a target setting item 401 is shown.

For example, the user can select a sample to be cleaned in target setting item 401, and can set a threshold value to be used for determination by controller 110 as to whether or not to clean the flow path and a threshold value for quitting cleaning. Furthermore, the user can select a method of cleaning an autosampler and a stream in an autosampler item 402 and a stream item 403. In setting screen 400, the user can also further set the number of times of injection of the blank solution.

Thus, in the present embodiment, various types of setting relating to automatic cleaning can be inputted in one setting screen so that convenience of the user is improved.

<Modification (Cleaning in Accordance with Status of Occurrence of Carryover)>

Figure 26:
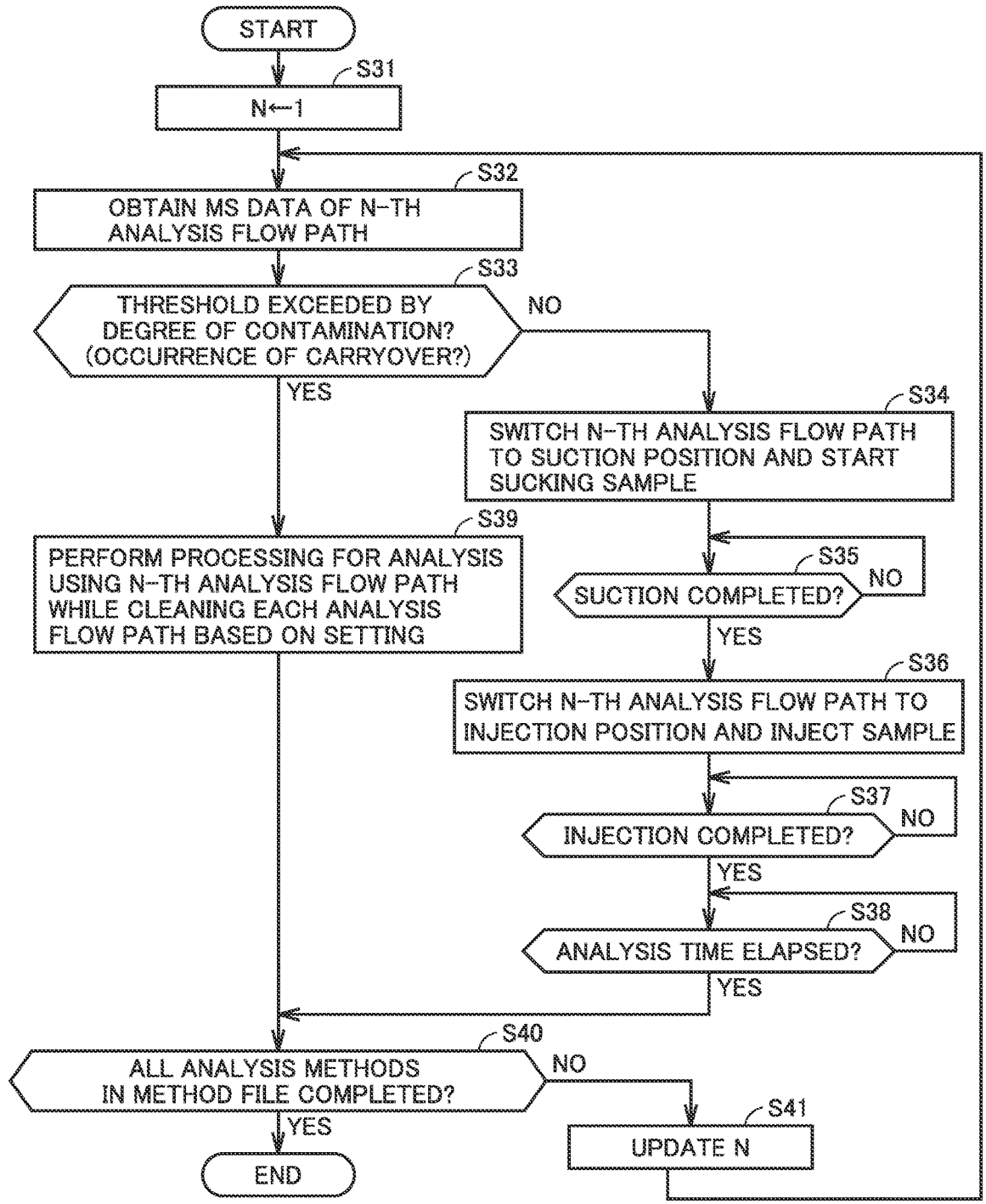
FIG. 26 is a flowchart showing contents of processing for cleaning the analysis flow path in accordance with a status of occurrence of carryover.

FIG. 26 is a flowchart showing contents of processing for cleaning the analysis flow path in accordance with a status of occurrence of carryover. Liquid chromatographic system 10 that cleans first analysis flow path 291A to fourth analysis flow path 291D based on a predetermined schedule has been described so far. Liquid chromatographic system 10, however, may detect occurrence of carryover and clean first analysis flow path 291A to fourth analysis flow path 291D in accordance with a status of occurrence thereof. In a modification, liquid chromatographic system 10 that cleans the analysis flow path in accordance with a status of occurrence of carryover will be described.

FIG. 26 is a flowchart for illustrating the modification. Processing based on the present flowchart is performed by controller 110.

Initially, controller 110 sets variable N to 1 (step S31). Then, controller 110 obtains MS data of the Nth analysis flow path (step S32). The MS data is used for determining whether or not carryover has occurred in the Nth analysis flow path.

For example, before start of new analysis through first analysis flow path 291A, detector 500 obtains analysis data based on the eluent that flows in column 230A in first analysis flow path 291A. If some of the sample used in preceding analyses remains in first analysis flow path 291A, the remaining sample will affect analysis data. Detector 500 transmits the obtained analysis data to controller 110 as MS data.

Controller 110 determines whether or not a degree of contamination of the Nth analysis flow path exceeds a threshold value, that is, whether or not carryover has occurred, based on the MS data (step S33).

When carryover has not occurred, controller 110 switches the Nth analysis flow path to the suction position and has the sample sucked by needle 191 (step S34). Then, controller 110 determines whether or not suction of the sample has been completed (step S35). More specifically, the controller determines whether or not a prescribed time period has elapsed since step S34. Controller 110 repeats determination in step S35 until it determines that suction of the sample has been completed. When controller 110 determines that suction of the sample has been completed, it switches the Nth analysis flow path to the injection position and has the sample injected (step S36). Thus, for example, in first analysis flow path 291A, the sample is injected into column 230A.

Then, controller 110 determines whether or not injection of the sample has been completed (step S37). More specifically, the controller determines whether or not a prescribed time period has elapsed since step S36. Controller 110 repeats determination in step S37 until it determines that injection of the sample has been completed. When controller 110 determines that injection of the sample has been completed, it determines whether or not predetermined analysis time has elapsed (step S38). Controller 110 repeats determination in step S38 until it determines that the analysis time has elapsed.

Then, controller 110 determines whether or not all analysis methods in a method file have been completed (step S40). When controller 110 determines that all the analysis methods in the method file have not been completed, it updates variable N (step S41) and the process returns to processing in step S32.

Thus, in the modification, when controller 110 determines that carryover has not occurred, it proceeds with processing for analysis through the analysis flow path of interest, without having cleaning in any of cleaning patterns 1 to 5 being performed.

When controller 110 determines in step S33 that carryover has occurred, it proceeds with processing for analysis through the Nth analysis flow path while it has the analysis flow path cleaned in accordance with the cleaning pattern and the timing of cleaning set in advance, in conformity with setting (step S39). Consequently, for example, depending on setting, processing shown in FIG. 23 may be performed. Thereafter, when controller 110 determines that all the analysis methods in the method file have been completed (YES in step S40), the controller quits the process based on the present flowchart.

According to the present modification, since the analysis flow path is cleaned in accordance with the status of occurrence of carryover, essentially unnecessary cleaning can be prevented from being performed. Depending on the degree of contamination on the occurrence of carryover, the cleaning pattern to be used for cleaning may be changed.

<Other Modifications>

(1) While the analysis flow path inclusive of diverter valve 90 is being cleaned, a portion to be cleaned in diverter valve 90 may be switched between port 95 connected to detector 500 and ports 96 and 97 connected to the liquid discharge pipe. In other words, as shown in FIG. 21, the analysis flow path may be cleaned in the second cleaning pattern and thereafter cleaned in the third cleaning pattern. Such switching of the cleaning pattern may be made based on a predetermined schedule. Alternatively, such switching of the cleaning pattern may be made in accordance with the status of occurrence of carryover.

(2) The number of high-pressure valves included in liquid chromatographic system 10 is not limited to four. For example, two high-pressure valves or five or more high-pressure valves may be provided. With increase in number of high-pressure valves, the number of analysis flow paths that can be used for analysis of a sample can be increased.

(3) Needle cleaning pump 20 does not have to be provided. Needle valve 260 does not have to be provided. In this case, a pipe that extends from sample loop 192 may be connected to first selector valve 150.

(4) A control unit that controls sample injection device 100 may be provided separately from controller 110 that controls liquid chromatographic system 10. In this case, controller 110 may control liquid chromatographic system 10 including sample injection device 100 in coordination with the control unit.

(5) A stationary phase with which columns 230A to 230D are filled should only be a stationary phase that can be used as the stationary phase for analysis in the liquid chromatographic system, and the same stationary phase or different stationary phases may be employed. The eluent with which containers 210A to 210D are filled should only be a solution that can be used as the mobile phase for analysis in the liquid chromatographic system, and the same solution or different solutions may be employed.

(6) A setting screen for setting a cleaning pattern for each of first analysis flow path 291A to fourth analysis flow path 291D may be shown on display device 125. In that case, an item with which setting for the cleaning pattern can be made for each of first analysis flow path 291A to fourth analysis flow path 291D may be shown on a single screen of display device 125.

(7) Types of the cleaning method such as the cleaning pattern and the cleaning solution and a condition for cleaning may be set by a manager through the setting screen based on a compound targeted for cleaning.

(8) Detector 500 is, for example, a mass spectrometer. Detector 500 may be any one of an absorbency detector, a PDA detector, a fluorescence detector, a differential refractometer, a conductivity detector, an evaporative light scattering detector, an electrochemical detector, an infrared spectrophotometer, an optical rotation detector, a circular dichroism detector, a flame ionization detector, a radiation detector, a dielectric constant detector, a chemiluminescence detector, an atomic absorption spectrophotometer, an inductive coupling plasma optical emission spectrometer, a high-frequency plasma mass spectrometer, a heat detector, an optical scattering detector, a viscosity detector, an ion electrode, an ultrasonic detector, and a nuclear magnetic resonance apparatus.

[Aspects]

Illustrative embodiments described above are understood by a person skilled in the art as specific examples of aspects below.

(Clause 1) A method according to one aspect is a method of cleaning a liquid chromatographic system. The liquid chromatographic system includes a first column and a second column for separation of a sample, a needle that takes a sample to be injected into the first column and the second column, an injection valve portion to which the first column and the second column are connected, the injection valve portion including a first injection valve connected to the first column and a second injection valve connected to the second column, a first pump that supplies an eluent to the first injection valve, a second pump that supplies an eluent to the second injection valve, a first analysis flow path constructed such that the eluent flows from the first injection valve toward the first column, a second analysis flow path constructed such that the eluent flows from the second injection valve toward the second column, and a selector valve connected to the first column and the second column, the selector valve switching an object to be connected to a detector between the first analysis flow path and the second analysis flow path. The method of cleaning a liquid chromatographic system includes setting a condition for feeding a cleaning solution or a blank sample to the selector valve, cleaning the first analysis flow path by feeding the cleaning solution or the blank sample while a first flow path through which the eluent flows from the first injection valve to the first column via the needle is set, and cleaning the first analysis flow path by feeding the cleaning solution or the blank sample while a second flow path through which the eluent flows from the first injection valve to the first column not via the needle is set.

According to the method of cleaning a liquid chromatographic system described in Clause 1, occurrence of carryover can be lessened, or on the occurrence of carryover, the carryover can be eliminated.

(Clause 2) A liquid chromatographic system according to another aspect includes a first column and a second column for separation of a sample, a needle that takes a sample to be injected into the first column and the second column, an injection valve portion to which the first column and the second column are connected, the injection valve portion including a first injection valve connected to the first column and a second injection valve connected to the second column, a first pump that supplies an eluent to the first injection valve, a second pump that supplies an eluent to the second injection valve, a first analysis flow path constructed such that the eluent flows from the first injection valve toward the first column, a second analysis flow path constructed such that the eluent flows from the second injection valve toward the second column, a selector valve connected to the first column and the second column, the selector valve switching an object to be connected to a detector between the first analysis flow path and the second analysis flow path, and a controller. The controller can have the first analysis flow path cleaned by feed of a cleaning solution or a blank sample while a first flow path through which the eluent flows from the first injection valve to the first column via the needle is set, and can have the first analysis flow path cleaned by feed of the cleaning solution or the blank sample while a second flow path through which the eluent flows from the first injection valve to the first column not via the needle is set.

According to the liquid chromatographic system described in Clause 2, occurrence of carryover can be lessened, or on the occurrence of carryover, the carryover can be eliminated.

(Clause 3) In the liquid chromatographic system described in Clause 2, the selector valve includes a main port to which the detector is connected, a first port to which the first column is connected, and a second port to which the second column is connected, the selector valve is constructed to switch an object to be connected to the main port between the first port and the second port, and the controller can have first cleaning performed to clean the first analysis flow path while the first flow path is set and while the main port and the first port are connected to each other and second cleaning performed to clean the first analysis flow path while the first flow path is set and while the main port and the first port are disconnected from each other.

According to the liquid chromatographic system described in Clause 3, while the analysis flow path is set to the first flow path, cleaning in a state that the main port and the first port among the ports of the selector valve are connected to each other and cleaning in a state that the main port and the first port are disconnected from each other can be performed. Therefore, the first flow path can minutely be cleaned.

(Clause 4) In the liquid chromatographic system described in Clause 3, the controller can have third cleaning performed to clean the first analysis flow path while the second flow path is set as the first analysis flow path by means of the first injection valve and while the main port and the first port are connected to each other and fourth cleaning performed to clean the first analysis flow path while the second flow path is set as the first analysis flow path by means of the first injection valve and while the main port and the first port are disconnected from each other.

According to the liquid chromatographic system described in Clause 4, while the analysis flow path is set to the second flow path, cleaning in a state that the main port and the first port among the ports of the selector valve are connected to each other and cleaning in a state that the main port and the first port are disconnected from each other can be performed. Therefore, the second flow path can minutely be cleaned.

(Clause 5) In the liquid chromatographic system described in any one of Clauses 2 to 4, the controller has the third cleaning performed following the second cleaning.

According to the liquid chromatographic system described in Clause 5, by performing third cleaning in succession to second cleaning, the analysis flow path can further minutely be cleaned.

(Clause 6) In the liquid chromatographic system described in any one of Clauses 2 to 5, the controller can have the selector valve cleaned by feed of the blank sample to the first injection valve or the second injection valve.

According to the liquid chromatographic system described in Clause 6, owing to the blank sample, in the selector valve, occurrence of carryover can be lessened, or on the occurrence of carryover, the carryover can be eliminated.

(Clause 7) The liquid chromatographic system described in any one of Clauses 2 to 6 further includes a first cleaning pump that supplies the cleaning solution to the first injection valve and a second cleaning pump that supplies the cleaning solution to the second injection valve. In the liquid chromatographic system, the controller can have the selector valve cleaned with the cleaning solution that flows through the first analysis flow path and the cleaning solution that flows through the second analysis flow path by having the first cleaning pump and the second cleaning pump driven.

According to the liquid chromatographic system described in Clause 7, the flow path including the selector valve through the first analysis flow path and the flow path including the selector valve through the second analysis flow path can efficiently be cleaned.

(Clause 8) In the liquid chromatographic system described in any one of Clauses 2 to 7, the controller specifies a degree of contamination of the eluent that flows from the first column to the detector based on analysis data outputted from the detector, and when the degree of contamination exceeds a threshold value, the controller has the first analysis flow path cleaned in a pattern set in advance.

According to the liquid chromatographic system described in Clause 8, efficient cleaning in accordance with a degree of contamination of the first analysis flow path can be performed.

(Clause 9) The liquid chromatographic system described in any one of Clauses 2 to 8 further includes a needle valve and a needle cleaning pump connected to the needle valve, the needle cleaning pump supplying the cleaning solution.

The needle includes a tip end and a base end. The tip end is connected to the injection valve portion via an injection port and the base end is connected to the needle valve through a pipe. The injection valve portion includes a needle port to which the injection port is connected and a drain port to which a discharge flow path is connected. The controller can have the needle cleaned by drive of the needle cleaning pump while the needle port and a discharge port are connected to each other by means of the injection valve portion.

According to the liquid chromatographic system described in Clause 9, a needle portion can be cleaned.

(Clause 10) The liquid chromatographic system described in any one of Clauses 2 to 9 further includes a memory in which setting relating to cleaning of the first flow path and the second flow path is stored. The controller updates the setting stored in the memory based on an operation for changing the setting and has the first flow path or the second flow path cleaned based on the setting stored in the memory.

According to the liquid chromatographic system described in Clause 10, by variously changing setting for cleaning depending on a status, the first flow path or the second flow path can appropriately be cleaned.

(Clause 11) The liquid chromatographic system described in Clause 10 further includes a display device. When the controller accepts the operation for changing the setting, the controller has an item of the setting shown on a screen of the display device.

According to the liquid chromatographic system described in Clause 11, the item of setting is shown on the screen of the display device. Therefore, setting can readily be changed.

(Clause 12) In the liquid chromatographic system described in any one of claims 2 to 11, the controller can have the second analysis flow path cleaned when a flow path through which the eluent flows from the second injection valve to the second column via the needle or a flow path through which the eluent flows from the second injection valve to the second column not via the needle is set as the second analysis flow path by means of the second injection valve.

According to the liquid chromatographic system described in Clause 12, the second analysis flow path in addition to the first analysis flow path can also appropriately be cleaned.

(Clause 13) The liquid chromatographic system described in any one of Clauses 2 to 12 further includes a third column, a third injection valve connected to the third column, and a third pump that supplies the eluent to the third injection valve. The selector valve is further connected to the third column and switches the object to be connected to the detector among the first column, the second column, and the third column.

According to the liquid chromatographic system described in Clause 13, with the use of the third analysis flow path in addition to the first and second analysis flow paths, the sample can more efficiently be analyzed.

Though an embodiment of the present invention has been described, it should be understood that the embodiment disclosed herein is illustrative and non-restrictive in every respect. The scope of the present invention is defined by the terms of the claims and is intended to include any modifications within the scope and meaning equivalent to the terms of the claims.

What is claimed is:

1. A method of cleaning a liquid chromatographic system, the liquid chromatographic system including
   a first column and a second column for separation of a sample,
   a needle that takes a sample to be injected into the first column and the second column,
   an injection valve portion to which the first column and the second column are connected, the injection valve portion including a first injection valve connected to the first column and a second injection valve connected to the second column,
   a first pump that supplies an eluent to the first injection valve,
   a second pump that supplies an eluent to the second injection valve,
   a first analysis flow path constructed such that the eluent flows from the first injection valve toward the first column,
   a second analysis flow path constructed such that the eluent flows from the second injection valve toward the second column, and
   a selector valve connected to the first column and the second column, the selector valve switching an object to be connected to a detector between the first analysis flow path and the second analysis flow path, the method comprising:
   setting a condition for feeding a cleaning solution or a blank sample to the selector valve;
   cleaning the first analysis flow path by feeding the cleaning solution or the blank sample while a first flow path through which the eluent flows from the first injection valve to the first column via the needle is set; and
   cleaning the first analysis flow path by feeding the cleaning solution or the blank sample while a second flow path through which the eluent flows from the first injection valve to the first column not via the needle is set.

2. A liquid chromatographic system comprising:
   a first column and a second column for separation of a sample;
   a needle that takes a sample to be injected into the first column and the second column;
   an injection valve portion to which the first column and the second column are connected, the injection valve portion including a first injection valve connected to the first column and a second injection valve connected to the second column;
   a first pump that supplies an eluent to the first injection valve;
   a second pump that supplies an eluent to the second injection valve;
   a first analysis flow path constructed such that the eluent flows from the first injection valve toward the first column;
   a second analysis flow path constructed such that the eluent flows from the second injection valve toward the second column;
   a selector valve connected to the first column and the second column, the selector valve switching an object to be connected to a detector between the first analysis flow path and the second analysis flow path; and
   a controller, wherein
   the controller
      has the first analysis flow path cleaned by feed of a cleaning solution or a blank sample while a first flow path through which the eluent flows from the first injection valve to the first column via the needle is set, and has the first analysis flow path cleaned by feed of the cleaning solution or the blank sample while a second flow path through which the eluent flows from the first injection valve to the first column not via the needle is set.

3. The liquid chromatographic system according to claim 2, wherein
the selector valve includes a main port to which the detector is connected, a first port to which the first column is connected, and a second port to which the second column is connected, the selector valve is constructed to switch an object to be connected to the main port between the first port and the second port, and
the controller has
first cleaning performed to clean the first analysis flow path while the first flow path is set and while the main port and the first port are connected to each other, and
second cleaning performed to clean the first analysis flow path while the first flow path is set and while the main port and the first port are disconnected from each other.

4. The liquid chromatographic system according to claim 3, wherein
the controller has
third cleaning performed to clean the first analysis flow path while the second flow path is set as the first analysis flow path by means of the first injection valve and while the main port and the first port are connected to each other, and
fourth cleaning performed to clean the first analysis flow path while the second flow path is set as the first analysis flow path by means of the first injection valve and while the main port and the first port are disconnected from each other.

5. The liquid chromatographic system according to claim 4, wherein
the controller has the third cleaning performed following the second cleaning.

6. The liquid chromatographic system according to claim 2, wherein
the controller has the selector valve cleaned by feed of the blank sample to the first injection valve or the second injection valve.

7. The liquid chromatographic system according to claim 2, further comprising:
a first cleaning pump that supplies the cleaning solution to the first injection valve; and
a second cleaning pump that supplies the cleaning solution to the second injection valve, wherein
the controller has the selector valve cleaned with the cleaning solution that flows through the first analysis flow path and the cleaning solution that flows through the second analysis flow path by having the first cleaning pump and the second cleaning pump driven.

8. The liquid chromatographic system according to claim 2, wherein
the controller specifies a degree of contamination of the eluent that flows from the first column to the detector based on analysis data outputted from the detector, and when the degree of contamination exceeds a threshold value, the controller has the first analysis flow path cleaned in a pattern set in advance.

9. The liquid chromatographic system according to claim 2, further comprising:
a needle valve; and
a needle cleaning pump connected to the needle valve, the needle cleaning pump supplying the cleaning solution, wherein
the needle includes a tip end and a base end,
the tip end is connected to the injection valve portion via an injection port and the base end is connected to the needle valve through a pipe,
the injection valve portion includes a needle port to which the injection port is connected and a drain port to which a discharge flow path is connected, and
the controller has the needle cleaned by drive of the needle cleaning pump while the needle port and a discharge port are connected to each other by means of the injection valve portion.

10. The liquid chromatographic system according to claim 2, further comprising a memory in which setting relating to cleaning of the first flow path and the second flow path is stored, wherein
the controller updates the setting stored in the memory based on an operation for changing the setting and has the first flow path or the second flow path cleaned based on the setting stored in the memory.

11. The liquid chromatographic system according to claim 10, further comprising a display device, wherein
when the controller accepts the operation for changing the setting, the controller has an item of the setting shown on a screen of the display device.

12. The liquid chromatographic system according to claim 2, wherein
the controller has the second analysis flow path cleaned while a flow path through which the eluent flows from the second injection valve to the second column via the needle or a flow path through which the eluent flows from the second injection valve to the second column not via the needle is set as the second analysis flow path by means of the second injection valve.

13. The liquid chromatographic system according to claim 2, further comprising:
a third column;
a third injection valve connected to the third column; and
a third pump that supplies the eluent to the third injection valve, wherein
the selector valve is further connected to the third column and switches the object to be connected to the detector among the first column, the second column, and the third column.

\* \* \* \* \*